(12) United States Patent  
Sugiura et al.

(10) Patent No.: US 12,140,060 B2
(45) Date of Patent: Nov. 12, 2024

(54) EXHAUST GAS PURIFICATION SYSTEM

(71) Applicants: Koji Sugiura, Toyota (JP); Seiji Nakahigashi, Toyota (JP); Masatoshi Ikebe, Kakegawa (JP); Takaya Ota, Kakegawa (JP); Takeshi Morishima, Kakegawa (JP); Eiji Harada, Kakegawa (JP)

(72) Inventors: Koji Sugiura, Toyota (JP); Seiji Nakahigashi, Toyota (JP); Masatoshi Ikebe, Kakegawa (JP); Takaya Ota, Kakegawa (JP); Takeshi Morishima, Kakegawa (JP); Eiji Harada, Kakegawa (JP)

(73) Assignees: TOYOTA JIDOSHA KABUSHIKI KAISHA, Toyota (JP); CATALER CORPORATION, Kakegawa (JP)

(*) Notice: Subject to any disclaimer, the term of this patent is extended or adjusted under 35 U.S.C. 154(b) by 0 days.

(21) Appl. No.: 18/347,742

(22) Filed: Jul. 6, 2023

(65) Prior Publication Data

US 2024/0018891 A1 Jan. 18, 2024

(30) Foreign Application Priority Data

Jul. 14, 2022 (JP) .................................. 2022-112841

(51) Int. Cl.
*F01N 13/00* (2010.01)
*F01N 3/022* (2006.01)
(Continued)

(52) U.S. Cl.
CPC ......... *F01N 13/009* (2014.06); *F01N 3/0222* (2013.01); *F01N 3/101* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2003/0106308 A1* | 6/2003 | Gabe | F02D 41/1438 60/297 |
| 2008/0010972 A1* | 1/2008 | Ikeda | F01N 13/0097 60/299 |

(Continued)

FOREIGN PATENT DOCUMENTS

JP 2016211582 A 12/2016

*Primary Examiner* — Binh Q Tran
(74) *Attorney, Agent, or Firm* — Dickinson Wright, PLLC

(57) ABSTRACT

Provided is an exhaust gas purification system that allows suppressing the emission of carbon monoxide (CO). An exhaust gas purification system includes a three-way catalyst and a particulate filter and a control device. The three-way catalyst and the particulate filter are arranged respectively on an upstream side and a downstream side of an exhaust channel connected to an internal combustion engine. The control device controls the internal combustion engine so as to execute fuel cut during a deceleration operation of the internal combustion engine. The particulate filter includes a honeycomb substrate and an outflow cell side catalyst layer. The honeycomb substrate includes a porous partition wall defining a plurality of cells extending from an inflow side end surface to an outflow side end surface. The plurality of cells include an inflow cell and an outflow cell adjacent across the partition wall. The inflow cell has an open inflow side end and a sealed outflow side end. The outflow cell has a sealed inflow side end and an open outflow side end. The outflow cell side catalyst layer is disposed on an outflow cell side catalyst region extending from an outflow side end to a position apart toward an inflow side of the partition wall along an extending direction.

3 Claims, 10 Drawing Sheets

(51) Int. Cl.
  *F01N 3/033*  (2006.01)
  *F01N 3/035*  (2006.01)
  *F01N 3/08*   (2006.01)
  *F01N 3/10*   (2006.01)
  *F01N 3/24*   (2006.01)

(52) U.S. Cl.
  CPC .............. *F01N 3/022* (2013.01); *F01N 3/033* (2013.01); *F01N 3/035* (2013.01); *F01N 3/0814* (2013.01); *F01N 3/0821* (2013.01); *F01N 3/24* (2013.01); *F01N 2250/02* (2013.01); *F01N 2330/02* (2013.01); *F01N 2330/48* (2013.01)

(56) References Cited

U.S. PATENT DOCUMENTS

| | | | |
|---|---|---|---|
| 2009/0235648 A1* | 9/2009 | Kakinohana | F02D 41/123 60/299 |
| 2011/0078997 A1 | 4/2011 | Boorse et al. | |
| 2016/0201534 A1* | 7/2016 | Lambert | F01N 3/035 60/274 |
| 2017/0241321 A1* | 8/2017 | Yoo | G01M 15/102 |
| 2018/0230874 A1 | 8/2018 | Ghoniem | |
| 2019/0353067 A1* | 11/2019 | Moser | F01N 3/0871 |
| 2021/0285354 A1* | 9/2021 | Chanko | F01N 3/035 |
| 2021/0293167 A1 | 9/2021 | Kaneko et al. | |

\* cited by examiner

EXHAUST GAS PURIFICATION SYSTEM

CROSS REFERENCE TO RELATED APPLICATIONS

The present application claims priority from Japanese patent application JP 2022-filed on Jul. 14, 2022, the entire content of which is hereby incorporated by reference into this application.

BACKGROUND

Description of Related Art

The present disclosure relates to an exhaust gas purification system that includes a three-way catalyst and a particulate filter arranged respectively on the upstream side and the downstream side of an exhaust channel connected to an internal combustion engine.

Background Art

An exhaust gas discharged from an internal combustion engine in, for example, an automobile contains a Particulate Matter (PM, hereinafter abbreviated as "PM" in some cases) mainly containing carbon, an ash as a non-combustible component, and the like, which cause air pollution. As a filter to trap and remove the PM from the exhaust gas, a filter having a wall flow structure has been widely used.

The filter having the wall flow structure usually includes a honeycomb substrate. The honeycomb substrate includes a porous partition wall defining a plurality of cells extending from an inflow side end surface to an outflow side end surface, and the plurality of cells include inflow cells and outflow cells adjacent across the partition wall. The inflow cell has an open inflow side end and a sealed outflow side end, and the outflow cell has a sealed inflow side end and an open outflow side end. In view of this, the exhaust gas flowed into the inflow cell from the inflow side end passes through the partition wall to flow into the outflow cell, thus being discharged from the outflow side end of the outflow cell. When the exhaust gas passes through the partition wall, the PM is accumulated in pores present in the partition wall. As examples of the filter having the wall flow structure, a gasoline particulate filter (hereinafter abbreviated as "GPF" in some cases) for gasoline engine and a diesel particulate filter (hereinafter abbreviated as "DPF" in some cases) for diesel engine have been known.

Meanwhile, in addition to the PM, the exhaust gas contains harmful components, such as carbon monoxide (CO), hydrocarbon (HC), and nitrogen oxide (NOx). The harmful components can be removed from the exhaust gas by a filter over which a catalyst, such as a noble metal catalyst, is applied. As the particulate filter, such as GPF and DPF, in addition to a non-coating type filter, a coating type filter has been known. The non-coating type filter is a filter having the wall flow structure over which a catalyst is not applied. The coating type filter is a filter over which a catalyst is applied to remove both the PM and the harmful components from the exhaust gas.

As the coating type filter, for example, a catalyst article disclosed in JP 2016-211582 A has been known. The catalyst article includes a wall flow filter having a plurality of longitudinally extending passages formed by longitudinally extending porous walls (partition walls) bounding and defining the passages (cells) and an axial length extending between an inlet end (inflow side end) and an outlet end (outflow side end). The passages include inlet passages (inflow cells) and outlet passages (outflow cells). The catalyst article further includes an SCR catalyst composition disposed within the porous walls and an oxidation catalyst disposed on the walls of the outlet passages extending from the outlet end and less than the axial length of the wall flow filter.

SUMMARY

Amid tightening of emission regulations in each region in the world, in addition to regulated values of PM emission weight, regulated values of Particulate Number (PN, hereinafter abbreviated as "PN" in some cases) of PM are being severely set. In particular, in Euro 7, which is considered as the next emission regulations in Europe, a PM collection rate of 95% or more is expected to be required.

As described above, as the filter having the wall flow structure, such as GPF and DPF, the non-coating type filter over which a catalyst is not applied and the coating type filter over which a catalyst is applied have been known. The non-coating type filter has a higher PM collection rate than the coating type filter. In view of this, for future tightening of PM emission regulations, the non-coating type filter is considered to be more effective. On the other hand, in the non-coating type filter, when the PM accumulating on the partition wall burns, incomplete combustion occurs, causing a problem of the emission of carbon monoxide (CO).

The present disclosure has been made in view of these points, and the present disclosure provides an exhaust gas purification system that allows suppressing the emission of carbon monoxide (CO).

To solve the above-described problem, an exhaust gas purification device of the present disclosure is an exhaust gas purification system that comprises a three-way catalyst and a particulate filter and a control device. The three-way catalyst and the particulate filter are arranged respectively on an upstream side and a downstream side of an exhaust channel connected to an internal combustion engine. The control device controls the internal combustion engine so as to execute fuel cut during a deceleration operation of the internal combustion engine. The particulate filter includes a honeycomb substrate and an outflow cell side catalyst layer. The honeycomb substrate includes a porous partition wall defining a plurality of cells extending from an inflow side end surface to an outflow side end surface. The plurality of cells include an inflow cell and an outflow cell adjacent across the partition wall. The inflow cell has an open inflow side end and a sealed outflow side end. The outflow cell has a sealed inflow side end and an open outflow side end. The outflow cell side catalyst layer is disposed either on a surface on the outflow cell side or in an inner region on the outflow cell side, or both on the surface and in the inner region in an outflow cell side catalyst region extending from an outflow side end of the partition wall to a position apart from the outflow side end toward an inflow side of the partition wall along an extending direction of the partition wall.

Effect

With the exhaust gas purification system of the present disclosure, the emission of carbon monoxide (CO) can be suppressed.

DETAILED DESCRIPTION OF THE EMBODIMENTS

The following describes an embodiment of an exhaust gas purification system according to the present disclosure.

The exhaust gas purification device according to the embodiment is an exhaust gas purification system that includes a three-way catalyst and a particulate filter and a control device. The three-way catalyst and the particulate filter are arranged respectively on an upstream side and a downstream side of an exhaust channel connected to an internal combustion engine. The control device controls the internal combustion engine so as to execute fuel cut during a deceleration operation of the internal combustion engine. The particulate filter includes a honeycomb substrate and an outflow cell side catalyst layer. The honeycomb substrate includes a porous partition wall defining a plurality of cells extending from an inflow side end surface to an outflow side end surface. The plurality of cells include an inflow cell and an outflow cell adjacent across the partition wall. The inflow cell has an open inflow side end and a sealed outflow side end. The outflow cell has a sealed inflow side end and an open outflow side end. The outflow cell side catalyst layer is disposed either on a surface on the outflow cell side or in an inner region on the outflow cell side, or both on the surface and in the inner region in an outflow cell side catalyst region extending from an outflow side end of the partition wall to a position apart from the outflow side end toward an inflow side of the partition wall along an extending direction of the partition wall.

In the embodiment, the "inflow side" means a side from which an exhaust gas flows in in the three-way catalyst and the particulate filter, and the "outflow side" means a side from which the exhaust gas flows out in the three-way catalyst and the particulate filter. The "extending direction of the partition wall" means a direction in which the partition wall extends. Furthermore, the honeycomb substrate has an axial direction usually approximately the same as the extending direction of the partition wall, and the cell has an extending direction (direction in which the cell extends) usually approximately the same as the extending direction of the partition wall. In the following description of the embodiment, the "extending direction" is the extending direction of the partition wall, and means the direction approximately the same as the axial direction of the honeycomb substrate and the extending direction of the cell.

First Embodiment

First, an outline of the exhaust gas purification system according to the embodiment will be described with an exhaust gas purification system according to the first embodiment as an example.

[Configuration of Exhaust Gas Purification System]

Figure 1:
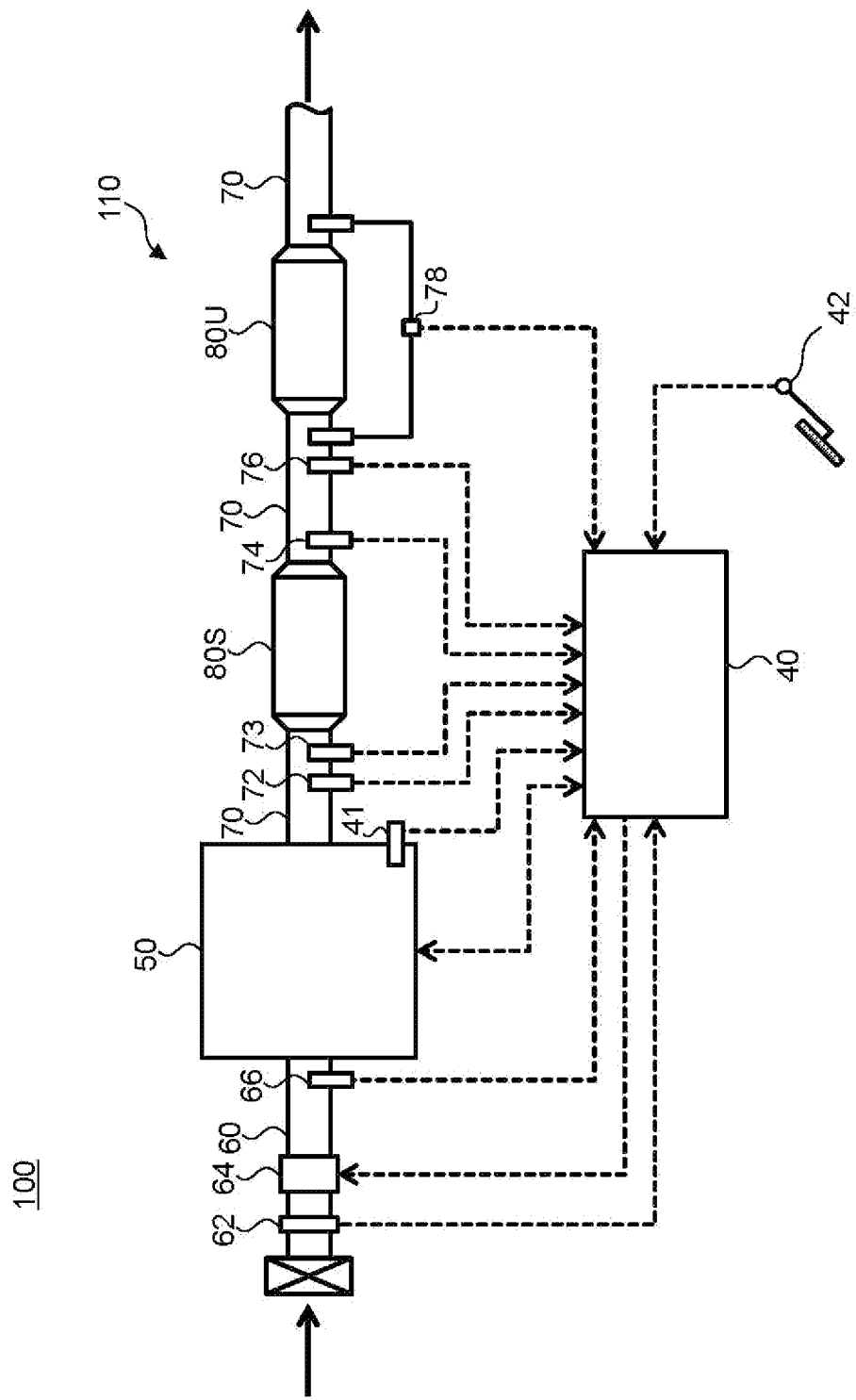
FIG. 1 is a drawing schematically illustrating a configuration of an intake and exhaust system of an internal combustion engine in which an exhaust gas purification system according to a first embodiment is applied.

The configuration of the exhaust gas purification system according to the first embodiment will be described. FIG. 1 is a drawing schematically illustrating a configuration of an intake and exhaust system of an internal combustion engine in which the exhaust gas purification system according to the first embodiment is applied.

As illustrated in FIG. 1, an exhaust gas purification system 110 according to the first embodiment functions in an intake and exhaust system 100 of an internal combustion engine 50. The internal combustion engine 50 is, for example, a gasoline engine for driving a vehicle. In the intake and exhaust system 100 of the internal combustion engine 50, an intake channel 60 and an exhaust channel 70 are connected to the internal combustion engine 50. In the intake channel 60, an air flow meter 62 is disposed on the upstream side. On the downstream side with respect to the air flow meter 62, a throttle valve 64 is disposed. On the downstream side with respect to the throttle valve 64, a pressure sensor 66 is disposed. The air flow meter 62 detects an intake air flow rate of the internal combustion engine 50. The throttle valve 64 changes a channel cross-sectional area of the intake channel 60 by controlling an opening degree Dth of the throttle valve 64 to control an inflow air quantity of the internal combustion engine 50. The pressure sensor 66 detects an intake air pressure Pin on the downstream side with respect to the throttle valve 64 of the intake channel 60.

In the exhaust channel 70, a three-way catalyst 80S is disposed immediately below the internal combustion engine 50 (on the upstream side), and a GPF (gasoline particulate filter) 80U is disposed on the downstream side of the three-way catalyst 80S.

In addition, in the exhaust channel 70, an upstream side air-fuel ratio sensor 72 and an oxygen concentration sensor 73 are disposed on the upstream side with respect to the three-way catalyst 80S. On the downstream side with respect to the three-way catalyst 80S, a downstream side air-fuel ratio sensor 74 is disposed. On the upstream side of the GPF 80U, a temperature sensor 76 is disposed. The upstream side air-fuel ratio sensor 72 detects an air-fuel ratio A/F of a gas that flows into the three-way catalyst 80S. The oxygen concentration sensor 73 detects an oxygen concentration of the gas. The downstream side air-fuel ratio sensor 74 detects an air-fuel ratio A/F of a gas that flows out of the three-way catalyst 80S. The temperature sensor 76 detects a temperature of a gas that flows into the GPF 80U and a bed temperature of the GPF 80U.

Furthermore, in the exhaust channel 70, a differential pressure sensor 78 that detects a differential pressure between the front and rear of the GPF 80U is disposed. The differential pressure sensor 78 detects a differential pressure between a pressure on the upstream side with respect to the GPF 80U and a pressure on the downstream side with respect to the GPF 80U in the exhaust channel 70.

An electronic control unit (hereinafter abbreviated as "ECU" in some cases) 40 is provided with the intake and exhaust system 100 of the internal combustion engine 50. The ECU 40 is electrically connected to the internal combustion engine 50 and controls the internal combustion engine 50. The air flow meter 62, the pressure sensor 66, the upstream side air-fuel ratio sensor 72, the oxygen concentration sensor 73, the downstream side air-fuel ratio sensor 74, the temperature sensor 76, and the differential pressure sensor 78 are electrically connected to the ECU 40. Furthermore, a crank angle sensor 41 and an accelerator position sensor 42 are electrically connected to the ECU 40. The crank angle sensor 41 outputs a signal correlated to the crank angle of the internal combustion engine 50. The accelerator position sensor 42 outputs a signal correlated to an accelerator position Dacc of a vehicle in which the internal combustion engine 50 is mounted. The detected values of the sensors are input to the ECU 40.

The ECU 40 derives an engine rotation speed NR of the internal combustion engine 50 based on the detected value of the crank angle sensor 41. In addition, the ECU 40 obtains the accelerator position Dacc based on the detected value of the accelerator position sensor 42 to derive an engine load LE of the internal combustion engine 50. Moreover, a fuel injection valve (not illustrated) of the internal combustion engine 50 and the throttle valve 64 are electrically connected to the ECU 40. The ECU 40 controls these devices.

The exhaust gas purification system 110 is an exhaust gas purification system that includes the three-way catalyst 80S and the GPF 80U arranged respectively on the upstream side and the downstream side of the exhaust channel 70, and the ECU (control device) 40. The ECU 40 controls the internal combustion engine 50 so as to execute fuel cut during the deceleration operation of the internal combustion engine 50.

[Configurations of Three-Way Catalyst and GPF]

Figure 2:
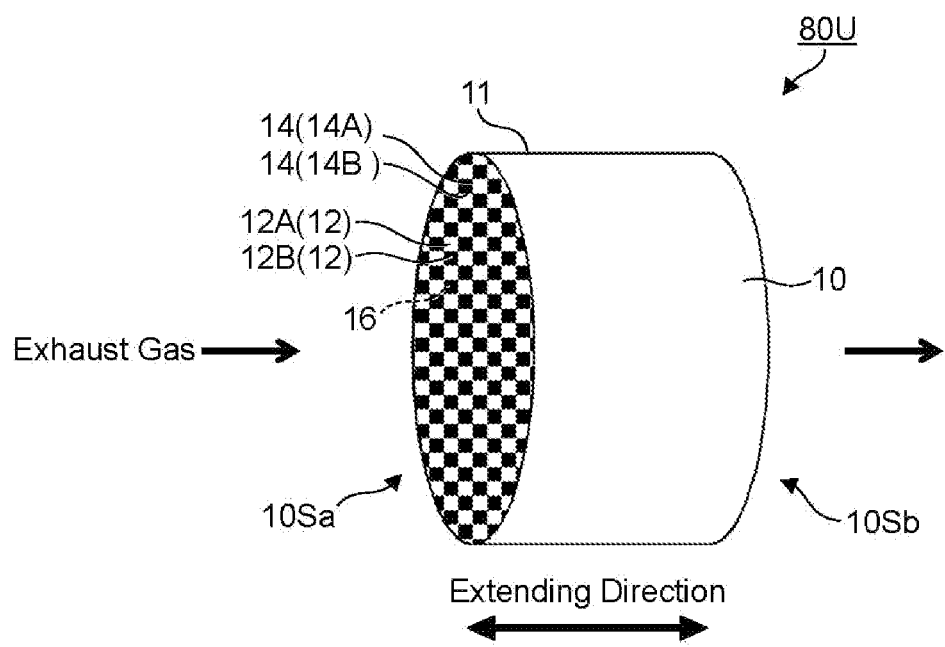
FIG. 2 is a perspective view schematically illustrating a GPF according to the first embodiment.

The three-way catalyst 80S and the GPF 80U according to the first embodiment will be further described in detail. FIG. 2 is a perspective view schematically illustrating a GPF according to the first embodiment, and FIG. 3 is a cross-sectional view schematically illustrating the main part of a cross-sectional surface parallel to the extending direction of cells in the GPF according to the first embodiment.

The three-way catalyst 80S is a catalyst having an oxygen storage/release capacity and oxidizes or reduces HC, CO, and $NO_X$ in an exhaust gas. Although not illustrated, the three-way catalyst 80S includes a monolith substrate and catalyst layers. The monolith substrate is a substrate in which a cylindrical-shaped frame portion and a partition wall partitioning a space inside the frame portion into a honeycomb shape are integrally formed. The partition wall of the monolith substrate is a porous body that defines a plurality of cells extending from an inflow side end surface to an outflow side end surface of the monolith substrate. The partition wall includes a plurality of wall portions arranged to be mutually separated and parallel and another plurality of wall portions intersecting with these plurality of wall portions and arranged to be mutually separated and parallel such that cross-sectional surfaces perpendicular to the extending direction of the plurality of cells have square shapes and the like. A cross-sectional surface of the partition wall perpendicular to the extending direction has a grid shape. The plurality of cells are adjacent across the partition wall and have inflow side ends and outflow side ends that are both open. The catalyst layer is disposed on the wall surface inside the cell in the partition wall of the monolith substrate and includes a porous carrier that coats the wall surface and catalyst metal particles supported by the porous carrier.

Figure 3:
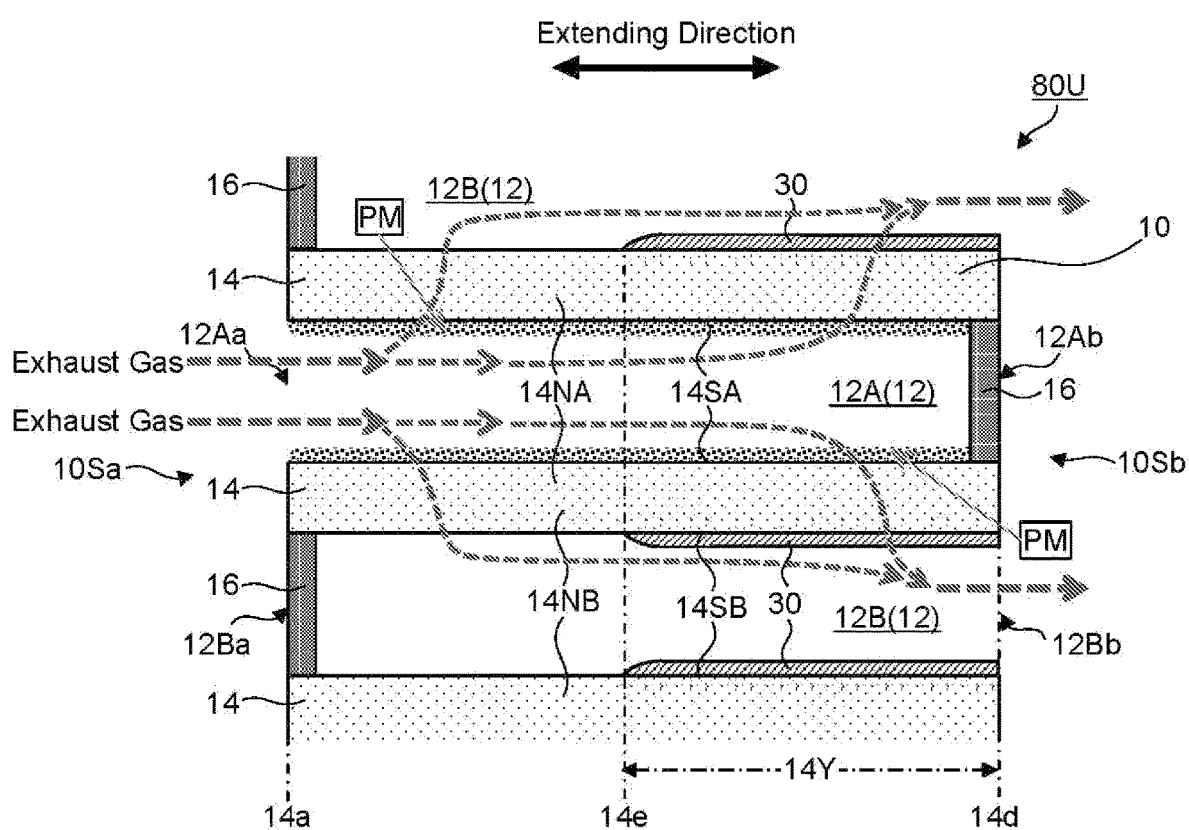
FIG. 3 is a cross-sectional view schematically illustrating the main part of a cross-sectional surface parallel to an extending direction of cells in the GPF according to the first embodiment.

The GPF 80U is a coating type filter in which a catalyst is applied over a filter having a wall flow structure to trap and remove PM from an exhaust gas, and specifically, as illustrated in FIG. 2 and FIG. 3, includes a honeycomb substrate 10, sealing portions 16, and outflow cell side catalyst layers 30.

As illustrated in FIG. 2 and FIG. 3, the honeycomb substrate 10 is a substrate in which a cylindrical-shaped frame portion 11 and a partition wall 14 partitioning a space inside the frame portion 11 into a honeycomb shape are integrally formed. The partition wall 14 is a porous body that defines a plurality of cells 12 extending from an inflow side end surface 10Sa to an outflow side end surface 10Sb of the honeycomb substrate 10. The partition wall 14 includes a plurality of wall portions 14A arranged to be mutually separated and parallel and a plurality of wall portions 14B orthogonal to the plurality of wall portions 14A and arranged to be mutually separated and parallel such that cross-sectional surfaces perpendicular to the extending direction of the plurality of cells 12 have square shapes. A cross-sectional surface of the partition wall 14 perpendicular to the extending direction has a grid shape.

The plurality of cells 12 include inflow cells 12A and outflow cells 12B adjacent across the partition wall 14. The inflow cell 12A has an open inflow side end 12Aa and an outflow side end 12Ab sealed by the sealing portion 16. The outflow cell 12B has an inflow side end 12Ba sealed by the sealing portion 16 and an open outflow side end 12Bb. The inflow cell 12A and the outflow cell 12B have cross-sectional shapes perpendicular to the extending direction having a rectangular shape.

As illustrated in FIG. 3, the outflow cell side catalyst layer 30 is disposed on a surface 14SB on the outflow cell 12B side in an outflow cell side catalyst region 14Y extending from an outflow side end 14d of the partition wall 14 to a position 14e apart from the outflow side end 14d by a distance of 52% of the length in the extending direction of the partition wall 14 toward the inflow side of the partition wall 14 along the extending direction. Although not illustrated, the outflow cell side catalyst layer 30 is also disposed in pores present in an inner region 14NB on the outflow cell 12B side in the outflow cell side catalyst region 14Y of the partition wall 14. Most of the outflow cell side catalyst layer 30 is disposed on the surface 14SB of the partition wall 14, and the rest is disposed in the pores of the inner region 14NB of the partition wall 14. The outflow cell side catalyst layer 30 includes a carrier and catalyst metal particles containing platinum (Pt) supported by the carrier.

[Control Method of Fuel Cut]

An exemplary method of control (hereinafter abbreviated as "control method of fuel cut" in some cases) performed when the ECU (control device) 40 controls the internal combustion engine 50 so as to execute fuel cut during the deceleration operation of the internal combustion engine 50 in the exhaust gas purification system 110 according to the first embodiment will be described. After a process routine of the exemplary control method of fuel cut is schematically described, a timing chart of each parameter in the process routine of the exemplary control method of fuel cut will be schematically described below.

(Process Flow)

Figure 4:
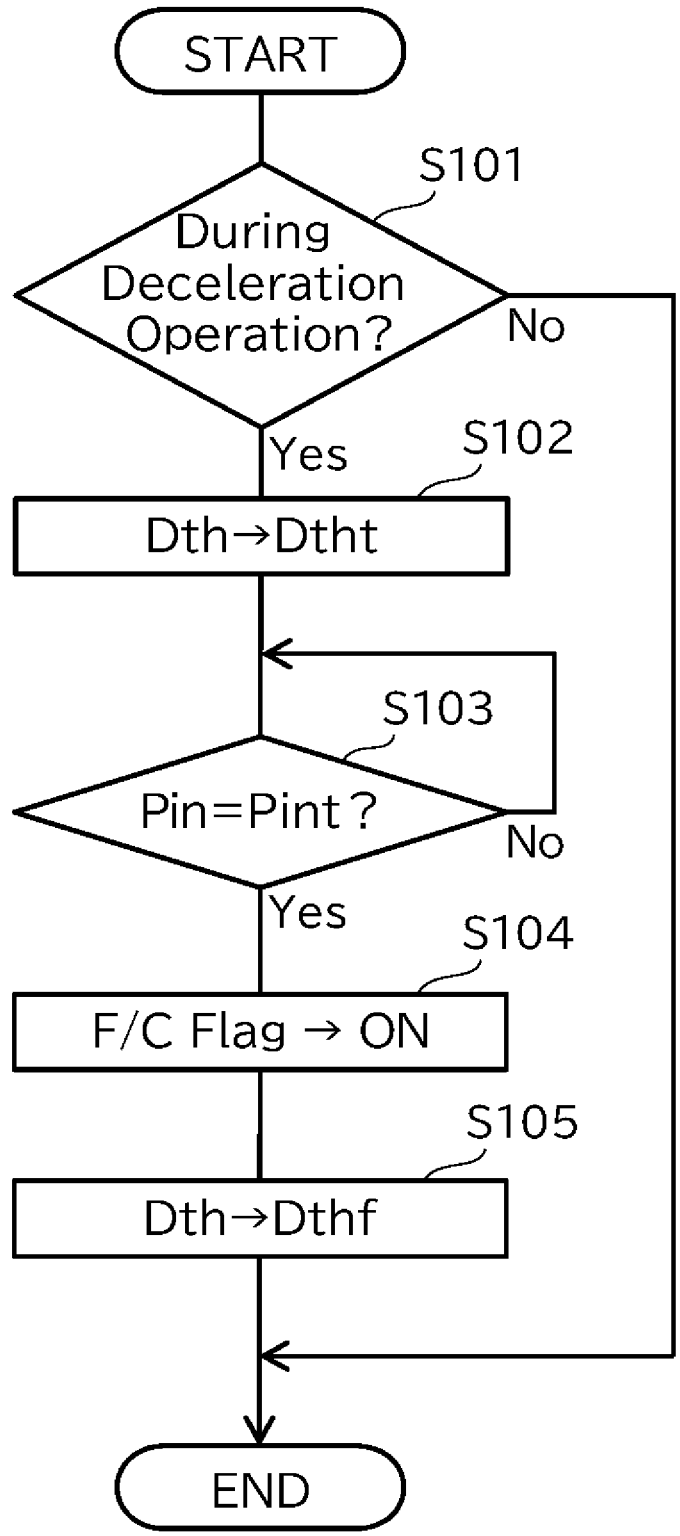
FIG. 4 is a flowchart schematically illustrating a process routine at the start of fuel cut execution in an exemplary control method of fuel cut according to the first embodiment.

FIG. 4 is a flowchart schematically illustrating the process routine at the start of fuel cut execution in the exemplary control method of fuel cut according to the first embodiment. The process routine illustrated in FIG. 4 is performed by an ECU during the operation of the internal combustion engine.

In the process routine illustrated in FIG. 4, first, in Step S101, the ECU 40 determines whether or not the internal combustion engine 50 is in deceleration operation. For example, the ECU 40 determines that the internal combustion engine 50 is in deceleration operation when the accelerator position Dacc is zero in a state where the engine rotation speed NR is larger than a predetermined rotation speed NRt and determines that the internal combustion engine 50 is not in deceleration operation when the accelerator position Dacc is larger than zero in this state. The predetermined rotation speed NRt is, for example, an engine rotation speed obtained by adding a predetermined margin to an engine rotation speed (idling rotation speed) during the idling operation of the internal combustion engine 50. When it is determined as negative in the process of Step S101, it is not necessary to execute fuel cut. Therefore, the ECU 40 once ends the execution of the process routine. On the other hand, when it is determined as affirmative, the ECU 40 proceeds to the process of Step S102.

In the next Step S102, the ECU 40 decreases the opening degree Dth of the throttle valve 64 to a target opening degree Dtht during the deceleration operation of the internal combustion engine 50 (hereinafter abbreviated as "target opening degree during deceleration" in some cases). The target opening degree during deceleration Dtht is, for example, a preset value as a throttle position corresponding to the engine rotation speed (idling rotation speed) during the idling operation of the internal combustion engine 50.

In the next Step S103, the ECU 40 determines whether or not the intake air pressure Pin on the downstream side with respect to the throttle valve 64 of the intake channel 60 detected by the pressure sensor 66 decreases to a target pressure during deceleration Pint corresponding to the target opening degree during deceleration Dtht. The process of Step S103 is repeated until determined as affirmative. When it is determined as affirmative in the process of Step S103, the ECU 40 proceeds to the process of Step S104.

In the next Step S104, the ECU 40 turns a fuel cut flag (F/C flag) ON and stops fuel injection from the fuel injection valve in the internal combustion engine 50 to start fuel cut execution.

In the next Step S105, the ECU 40 increases the opening degree Dth of the throttle valve 64 to an opening degree (hereinafter abbreviated as "increased opening degree during F/C" in some cases) Dthf increased by a predetermined amount from the target opening degree during deceleration Dtht.

Figure 5:
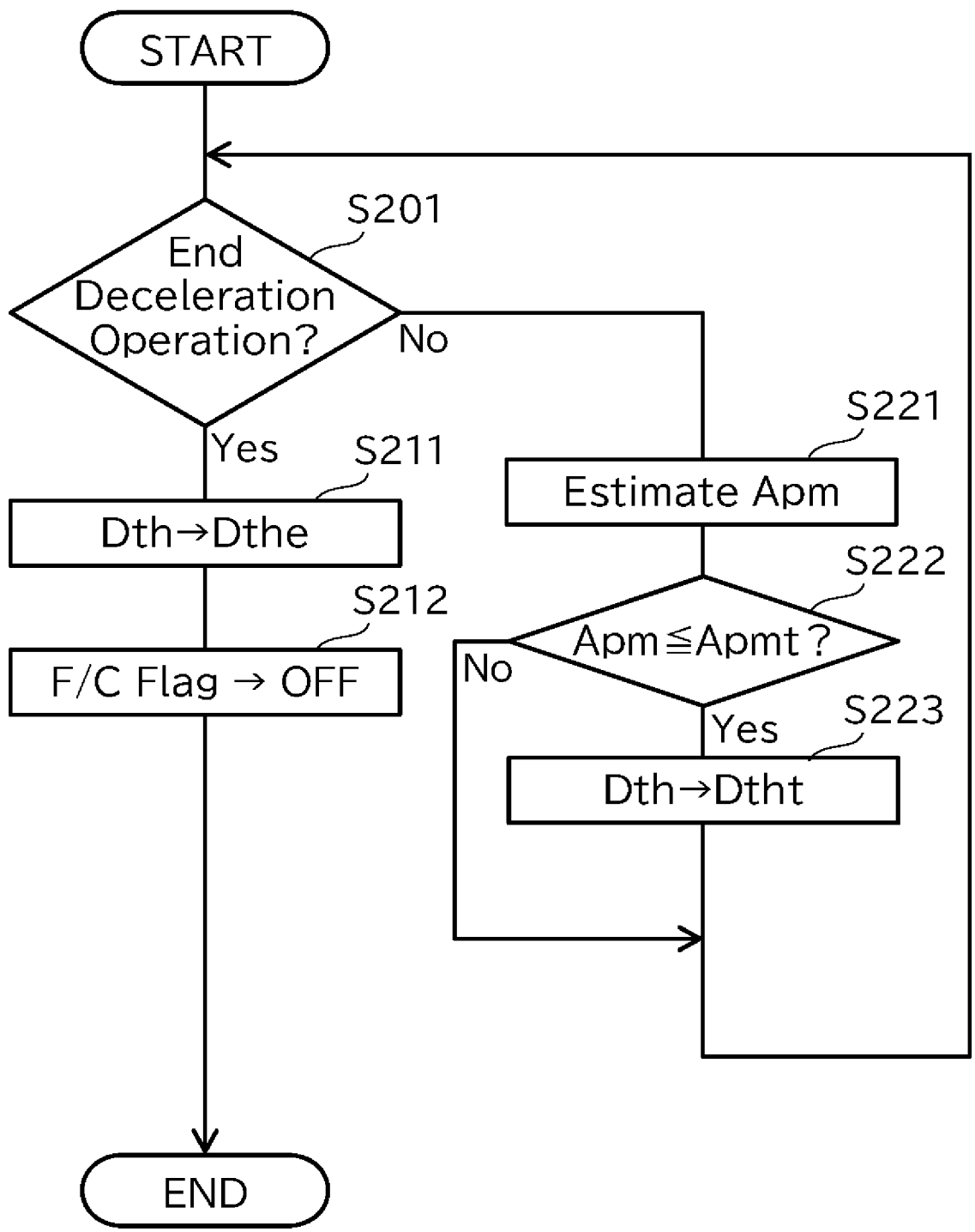
FIG. 5 is a flowchart schematically illustrating a process routine from a time point during the fuel cut execution to the end in the exemplary control method of fuel cut according to the first embodiment.

Subsequently, FIG. 5 is a flowchart schematically illustrating a process routine from a time point during the fuel cut execution to the end in the exemplary control method of fuel cut according to the first embodiment. The process routine illustrated in FIG. 5 is performed by the ECU during the fuel cut execution.

In the process routine illustrated in FIG. 5, first, in Step S201, the ECU 40 determines whether or not the internal combustion engine 50 ends the deceleration operation. Specifically, the ECU 40 determines that the internal combustion engine 50 ends the deceleration operation when the accelerator position Dacc is larger than zero and determines that the internal combustion engine 50 continues the deceleration operation when it is not. When it is determined as affirmative in the process of Step S201, the ECU 40 proceeds to the process of Step S211. On the other hand, when it is determined as negative, the ECU 40 proceeds to the process of Step S221.

When proceeding to the process of Step S211, in the next Step S211, the ECU 40 increases the opening degree Dth of the throttle valve 64 to a target opening degree (hereinafter abbreviated as "target opening degree corresponding to load" in some cases) Dthe corresponding to the engine load LE depending on the accelerator position Dacc that becomes larger than zero. In the next Step S212, the ECU 40 turns the F/C flag OFF and resumes the fuel injection from the fuel injection valve in the internal combustion engine 50 to end the fuel cut execution. Afterwards, the execution of the process routine once ends.

On the other hand, when proceeding to the process of Step S221, in the next Step S221, the ECU 40 estimates an accumulation amount Apm of the particulate matter (PM) accumulating on the GPF 80U based on a differential pressure Pud between the front and rear of the GPF 80U detected by the differential pressure sensor 78.

In the next Step S222, the ECU 40 determines whether or not the PM accumulation amount Apm estimated in the process of Step S221 is equal to or less than a preset target accumulation amount Apmt. When it is determined as negative in the process of Step S222, the ECU 40 returns to the process of Step S201 without proceeding to the process of Step S223. On the other hand, when it is determined as affirmative, the ECU 40 proceeds to the process of Step S223.

In the next Step S223, the ECU 40 decreases the opening degree Dth of the throttle valve 64 from the increased opening degree during F/C Dthf to the target opening degree during deceleration Dtht during the deceleration operation of the internal combustion engine 50. Afterwards, the ECU 40 returns to the process of Step S201.

(Timing Chart)

Figure 6:
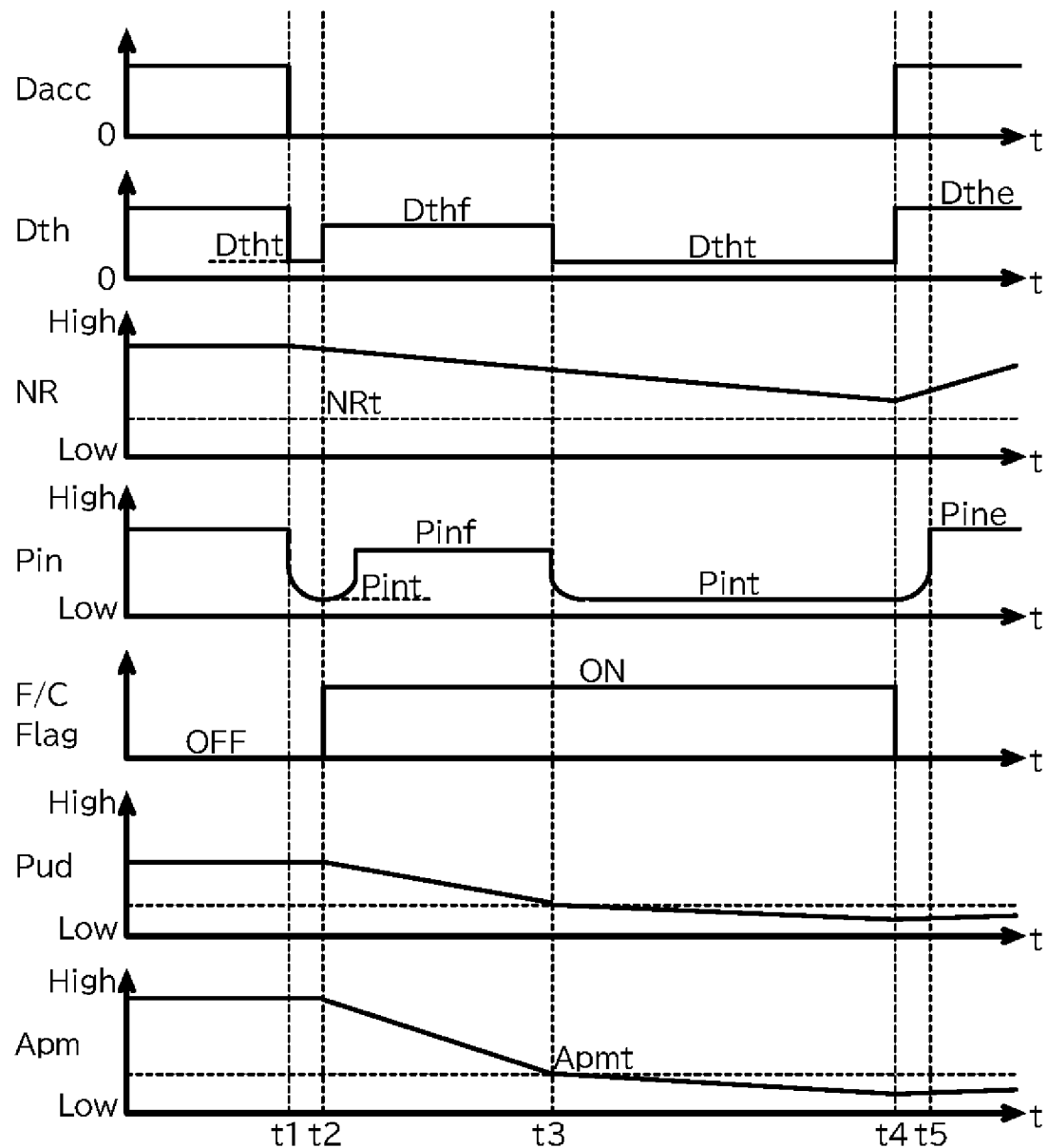
FIG. 6 is a schematic timing chart of each parameter when the process routines in the exemplary control method of fuel cut according to the first embodiment are executed.

FIG. 6 is a schematic timing chart of each parameter when the process routines in the exemplary control method of fuel cut according to the first embodiment are executed.

In the timing chart illustrated in FIG. 6, first, at the time point of a time t1, the engine rotation speed NR is in a state of being larger than the predetermined rotation speed NRt, and the accelerator position Dacc becomes zero. This determines that the internal combustion engine 50 is in deceleration operation. In response, the opening degree Dth of the throttle valve 64 decreases to the target opening degree during deceleration Dtht. As a result, the intake air pressure Pin on the downstream side with respect to the throttle valve 64 of the intake channel 60 starts to lower from the time point of the time t1 and lowers to the target pressure during deceleration Pint corresponding to the target opening degree during deceleration Dtht at the time point of a time t2.

Next, at the time point of the time t2, when the intake air pressure Pin reaches the target pressure during deceleration Pint, the fuel cut flag (F/C flag) turns ON. This starts the fuel cut execution. That is, the fuel injection from the fuel injection valve in the internal combustion engine 50 stops. The opening degree Dth of the throttle valve 64 increases from the target opening degree during deceleration Dtht to the increased opening degree during F/C Dthf. This raises the intake air pressure Pin to an increased pressure during F/C Pinf corresponding to the increased opening degree during F/C Dthf.

Next, at the time point of a time t3, when the PM accumulation amount Apm estimated from the differential pressure Pud between the front and rear of the GPF 80U is equal to or less than the preset target accumulation amount Apmt, the opening degree Dth of the throttle valve 64 decreases from the increased opening degree during F/C Dthf to the target opening degree during deceleration Dtht again. This lowers the intake air pressure Pin to the target pressure during deceleration Pint again.

Next, at the time point of a time t4, the accelerator position Dacc becomes larger than zero. This determines that the internal combustion engine 50 ends the deceleration operation. In response, the opening degree Dth of the throttle valve 64 increases to the target opening degree corresponding to load Dthe. The fuel cut flag (F/C flag) turns ON. This ends the fuel cut execution. That is, the fuel injection from the fuel injection valve in the internal combustion engine 50 resumes. Furthermore, the intake air pressure Pin starts to rise from the time point of the time t4 and rises to a target pressure corresponding to load Pine corresponding to the target opening degree corresponding to load Dthe at the time point of a time t5.

The control method of fuel cut performed by the ECU 40 in the exhaust gas purification system 110 according to the first embodiment is not limited to the example described above. As long as it is a method that controls the internal combustion engine 50 so as to execute fuel cut during the deceleration operation of the internal combustion engine 50, it is not specifically limited, and various control methods are possible.

[Operational Advantage]

In the exhaust gas purification system 110 according to the first embodiment, in the control method of fuel cut by the ECU 40, the internal combustion engine 50 is controlled so as to execute fuel cut during the deceleration operation of the internal combustion engine 50. At the time of the fuel cut execution, the fuel injection from the fuel injection valve in the internal combustion engine 50 is stopped, and the opening degree Dth of the throttle valve 64 decreases to the target opening degree during deceleration Dtht. However, the throttle valve 64 is not completely closed, and air flows into the internal combustion engine 50 via the intake channel 60. In view of this, at the time of the fuel cut execution, a gas containing air without containing a burnt gas is discharged from the internal combustion engine 50 to the exhaust channel 70, and the exhaust gas is distributed to the GPF 80U via the three-way catalyst 80S.

At the start of the fuel cut execution, as illustrated in FIG. 3, the particulate matter (PM) mainly containing carbon (C) accumulates on surfaces 14SA and in pores (not illustrated) in inner regions 14NA and the like on the inflow cell 12A sides of the partition wall 14 of the honeycomb substrate 10 included in the GPF 80U. Since the exhaust gas discharged from the internal combustion engine 50 at the time of the fuel cut execution is heated in the internal combustion engine 50, the temperature of the exhaust gas is maintained at around 600° C. to 650° C. or more at the stage of flowing into the GPF 80U in some cases. In view of this, by distributing the exhaust gas discharged from the internal combustion engine 50 at the time of the fuel cut execution to the GPF 80U, C in the PM in the partition wall 14 of the honeycomb substrate 10 can be burnt at the temperature of around 600° C. to 650° C. or more by oxygen (O2) in air, allowing burning and removing the PM. At this time, in addition to the generation of carbon dioxide (CO$_2$) by complete combustion shown in the following reaction equation (1), carbon monoxide (CO) is generated by incomplete combustion shown in the following reaction equation (2).

$$C + O_2 \rightarrow CO_2 \tag{1}$$

$$2C + O_2 \rightarrow 2CO \tag{2}$$

In contrast to this, in the GPF 80U according to the first embodiment, the outflow cell side catalyst layers 30 are disposed on the surfaces 14SB and in the inner regions 14NB on the outflow cell 12B sides in the outflow cell side catalyst region 14Y extending from the outflow side end 14d of the partition wall 14 to the inflow side of the partition wall 14, and the outflow cell side catalyst layers 30 includes the catalyst metal particles containing Pt supported by the carrier. In view of this, different from a case where the catalyst layers are disposed in a region extending along the extending direction from an inflow side end 14a to the outflow side of the partition wall 14, most of the CO generated by the incomplete combustion of C in the PM in the partition wall of the honeycomb substrate can be flowed along the catalyst layers (outflow cell side catalyst layers) or caused to pass through the catalyst layers. At this time, by a catalytic reaction by Pt, most of the CO can be converted into CO$_2$ by causing to react with O$_2$ as illustrated in the following reaction equation (3). This can suppress the emission of CO from the GPF 80U.

$$2CO + O_2 \rightarrow 2CO_2 \tag{3}$$

In the control method of fuel cut by the ECU 40, by increasing the opening degree Dth of the throttle valve 64 from the target opening degree during deceleration Dtht to the increased opening degree during F/C Dthf during the fuel cut execution, the exhaust gas containing a larger amount of air than that in a conventional case where the opening degree Dth of the throttle valve 64 is maintained at the target opening degree during deceleration Dtht can be distributed to the GPF 80U. This can accelerate the reaction that burns and removes the PM in the partition wall 14 of the honeycomb substrate 10. Furthermore, in association with this, also when the CO generated by the incomplete combustion in the reaction that burns and removes the PM is large in amount, most of the CO can be converted into CO$_2$ by the outflow cell side catalyst layers 30. Accordingly, the reaction that burns and removes the PM in the GPF 80U can be accelerated, and the emission of CO from the GPF 80U can be effectively suppressed.

Furthermore, in the control method of fuel cut by the ECU 40, in a state where the opening degree Dth of the throttle valve 64 is increased to the increased opening degree during F/C Dthf during the fuel cut execution, the exhaust gas containing a large amount of air flows also into the three-way catalyst 80S. In view of this, if this state continues until the fuel cut execution ends, the catalyst layers of the three-way catalyst 80S are possibly oxidized and deteriorate by a large amount of oxygen in the exhaust gas. In contrast to this, in the control method of fuel cut by the ECU 40, at the time point when the PM accumulation amount Apm becomes equal to or less than the preset target accumulation amount Apmt, the opening degree Dth of the throttle valve 64 is decreased from the increased opening degree during F/C Dthf to the target opening degree during deceleration Dtht. This can stop the inflow of the exhaust gas containing a large amount of air to the three-way catalyst 80S at the time point when the PM is burned and removed to a target level. Accordingly, deterioration of the three-way catalyst 80S can be suppressed.

Therefore, with the exhaust gas purification system according to the embodiment, for example, like the first embodiment, the emission of CO can be suppressed. When, during the fuel cut execution, the opening degree of a throttle valve is made larger than a target opening degree during the deceleration operation of the internal combustion engine, the reaction that burns and removes the PM in the particulate filter is accelerated, and the emission of CO can be effectively suppressed. Furthermore, during the fuel cut execution, when the opening degree of the throttle valve is made larger than the target opening degree during the deceleration operation, subsequently the accumulation amount of a particulate matter accumulating on the particulate filter is estimated, and the opening degree of the throttle valve is decreased when the accumulation amount of the particulate matter becomes equal to or less than a preset target accumulation amount, deterioration of the three-way catalyst can be suppressed.

Subsequently, each configuration of the exhaust gas purification system according to the embodiment will be described in detail.

1. Particulate Filter

The particulate filter includes the honeycomb substrate and the outflow cell side catalyst layers.

(1) Honeycomb Substrate

The honeycomb substrate includes the porous partition wall defining the plurality of cells extending from the inflow side end surface to the outflow side end surface. The plurality of cells include the inflow cells and the outflow cells adjacent across the partition wall. The inflow cell has the open inflow side end and the sealed outflow side end, and the outflow cell has the sealed inflow side end and the open outflow side end. The honeycomb substrate is what is called a wall flow type honeycomb substrate.

The honeycomb substrate is a substrate in which the frame portion and the partition wall partitioning the space inside the frame portion into the honeycomb shape are integrally formed. An axial length of the honeycomb substrate is not specifically limited, and a common length can be used. A capacity of the honeycomb substrate, namely, a total volume of the cells is not specifically limited, and a common capacity can be used.

While a material of the honeycomb substrate is not specifically limited and a common material can be used, examples of the material include, a ceramic, such as cordierite, silicon carbide (SiC), and aluminum titanate, and an alloy, such as a stainless steel.

A shape of the frame portion is not specifically limited, and a common shape can be used. A shape of the partition wall is not specifically limited, and a common shape can be used. The partition wall has a porous structure having pores as a pore through which the exhaust gas can pass. While a length in the extending direction of the partition wall is not specifically limited, the length is usually approximately the same as the axial length of the honeycomb substrate. A thickness of the partition wall is not specifically limited, and a common thickness can be used.

The inflow cells and the outflow cells are formed by partitioning the space inside the frame portion with the partition wall, and adjacent across the partition wall. The inflow cells and the outflow cells are usually surrounded by the partition wall in a direction perpendicular to the extending direction. The inflow cell has the outflow side end usually sealed by the sealing portion. The outflow cell has the inflow side end usually sealed by the sealing portion. A length in the extending direction of the sealing portion is not specifically limited, and a common length may be used. A material of the sealing portion is not specifically limited and may be a common material.

Cross-sectional shapes perpendicular to the extending direction of the inflow cell and the outflow cell are not specifically limited, and common shapes can be used. Cross-sectional areas perpendicular to the extending direction of the inflow cell and the outflow cell are not specifically limited, and common cross-sectional areas can be used. While lengths in the extending direction of the inflow cell and the outflow cell are not specifically limited, the lengths are usually approximately the same as a length found by subtracting the length in the extending direction of the sealing portion from the axial length of the honeycomb substrate. Examples of an arrangement aspect of the inflow cells and the outflow cells include, like the arrangement aspect of the first embodiment, an aspect like a checkered pattern in which the inflow cells and the outflow cells are arranged in alternation.

(2) Outflow Cell Side Catalyst Layer

The outflow cell side catalyst layer is disposed either on the surface on the outflow cell side or in the inner region (pores present in the inner region) on the outflow cell side, or both on the surface and in the inner region in the outflow cell side catalyst region extending from the outflow side end of the partition wall to a position apart from the outflow side end toward the inflow side of the partition wall along the extending direction of the partition wall.

The outflow cell side catalyst region of the partition wall is not specifically limited insofar as the region extends from the outflow side end of the partition wall to the position apart by a predetermined distance toward the inflow side along the extending direction. For example, like the first embodiment, the outflow cell side catalyst region is a region extending from the outflow side end of the partition wall to a position apart by a distance of 25% or more and 100% or less of the length in the extending direction of the partition wall toward the inflow side along the extending direction in some embodiments, may be a region extending to a position apart by a distance of 25% or more and 80% or less of the length in the extending direction of the partition wall, and may be a region extending to a position apart by a distance of 40% or more and 70% or less of the length in the extending direction of the partition wall. This is because the length in the extending direction of the outflow cell side catalyst region (the length in the extending direction of the outflow cell side catalyst layer) equal to or more than the lower limits in the distance ranges can suppress the emission of CO sufficiently. Moreover, this is because the length in the extending direction of the outflow cell side catalyst region equal to or less than the upper limits in the distance ranges can sufficiently trap the PM, suppress a pressure loss, and reduce costs when the outflow cell side catalyst layers are formed.

While the outflow cell side catalyst layer is not specifically limited insofar as it is disposed either on the surface on the outflow cell side or in the inner region on the outflow cell side, or both on the surface and in the inner region in the outflow cell side catalyst region of the partition wall, the outflow cell side catalyst layer is disposed on the surface on the outflow cell side in the outflow cell side catalyst region of the partition wall in some embodiments. This is because the pressure loss can be suppressed.

The outflow cell side catalyst layer usually includes catalyst metal particles and a carrier supporting the catalyst metal particles, and is, for example, a sintered body including a carrier with catalyst in which the catalyst metal particles are supported by the carrier.

While the catalyst metal particles are not specifically limited and a common material of a noble metal or the like can be used, examples of the material include a material containing at least one of platinum (Pt), palladium (Pd), or rhodium (Rh). The catalyst metal particles contain at least one of Pt or Pd in some embodiments. This is because oxidation from CO to $CO_2$ easily occurs in the catalytic reactions.

While a mean particle size of the catalyst metal particles is not specifically limited and a common mean particle size can be used, the mean particle size is, for example, in a range of 0.1 nm or more and 20 nm or less in some embodiments. This is because the mean particle size equal to or less than the upper limit of the range allows increasing a contact area with the exhaust gas. The mean particle size of the catalyst metal particles means, for example, an average value obtained from particle sizes measured by a transmission electron microscope (TEM).

While a content of the catalyst metal particles is not specifically limited and may be a common content, the content differs depending on the material of the catalyst metal particles. For example, when the material is at least one of Pt, Pd, or Rh, the content is in a range of 0.01 g or more and 2 g or less per liter of the honeycomb substrate in some embodiments. This is because the content equal to or more than the lower limit of the range can provide the sufficient catalytic action, and the content equal to or less than the upper limit of the range can suppress the grain growth of the catalyst metal particles and provide an advantage in the aspect of cost. Here, the content of the catalyst metal particles per liter of the substrate volume means a value obtained by dividing the mass of the catalyst metal particles contained in the outflow cell side catalyst layer by the volume of a part of the honeycomb substrate in the axial direction having the axial length the same as the length in the extending direction of the outflow cell side catalyst layer (outflow cell side catalyst region).

While a material of the carrier is not specifically limited and a common material can be used, examples of the material include a metallic oxide, such as alumina ($Al_2O_3$), ceria ($CeO_2$), and zirconia ($ZrO_2$), and a solid solution of an alumina-zirconia ($Al_2O_3$—$ZrO_2$) composite oxide, a ceria-zirconia ($CeO_2$—$ZrO_2$) composite oxide, and the like. The material of the carrier may be one or two or more among them. The material of the carrier is at least one of alumina, ceria-zirconia composite oxide, or the like in some embodiments. While a shape of the carrier is not specifically limited and a common shape can be used, the carrier is in powder form in some embodiments. This is because a larger specific surface area can be secured. A mean particle size of the carrier in powder form is not specifically limited and may be a common mean particle size.

A mass ratio of the catalyst metal particles to a total mass of the catalyst metal particles and the carrier is not specifically limited, and a common mass ratio can be used. While a method that causes the carrier to support the catalyst metal particles is not specifically limited and a common method can be used, examples of the method include a method in which the carrier is immersed in an aqueous solution containing a catalytic metal salt (such as nitrate) or a catalytic metal complex (such as tetraamine complex) and subsequently dried and fired.

The outflow cell side catalyst layer may include a cocatalyst, such as an Oxygen Storage Capacity (OSC) material, in addition to the catalyst metal particles and the carrier. While a material of the cocatalyst is not specifically limited, and a common material may be used, examples of the material include a material similar to that of the carrier. In particular, examples of the material of the OSC material among cocatalysts include ceria, a composite oxide containing ceria, and the like. Examples of the composite oxide containing ceria include a ceria-zirconia composite oxide and the like. While a shape of the cocatalyst and a mean particle size of the cocatalyst in powder form are not specifically limited and a common shape may be used, examples of the shape and the mean particle size include a shape and a mean particle size similar to those of the carrier.

While a density of the outflow cell side catalyst layer is not specifically limited, for example, the density is in a range of 30 g/L or more and 250 g/L or less in some embodiments. This is because the density equal to or more than the lower limit of the range allows effectively improving purification performance. That is because the density equal to or less than the upper limit of the range allows effectively suppressing the pressure loss. The "density of the outflow cell side catalyst layer" means a value obtained by dividing the mass of the outflow cell side catalyst layer by the volume of a part of the honeycomb substrate in the axial direction having the axial length the same as the length in the extending direction of the outflow cell side catalyst layer.

While a method for forming the outflow cell side catalyst layer is not specifically limited and may be a common method, examples of the method include a method in which a slurry prepared by mixing the carrier with catalyst in which the catalyst metal particles are supported by the carrier with a solvent is supplied to at least one of the surface on the outflow cell side or the inner region on the outflow cell side in the outflow cell side catalyst region of the partition wall, and subsequently, the slurry is dried and fired.

The slurry may contain any given component such as a cocatalyst, a binder, and an additive as necessary in addition to the catalyst metal particles and the carrier, and the solvent. A method for preparing the slurry is not specifically limited and may be a common method. A mean particle size of the solid content of the slurry is not specifically limited and may be a common mean particle size.

A method for supplying the slurry to at least one of the surface on the outflow cell side or the inner region on the outflow cell side in the outflow cell side catalyst region of the partition wall is not specifically limited and may be a common method. In the method in which the slurry is dried and fired after the slurry is supplied to the partition wall, the drying and firing conditions are not specifically limited and may be common conditions.

(3) Inflow Cell Side Catalyst Layer

The particulate filter may be one that further includes inflow cell side catalyst layers. The inflow cell side catalyst layer is disposed either on a surface on an inflow cell side or in an inner region (pores present in the inner region) on the inflow cell side, or both on the surface and in the inner region in an inflow cell side catalyst region extending from the inflow side end to a position apart from the inflow side end toward the outflow side of the partition wall along the extending direction.

The inflow cell side catalyst region of the partition wall is not specifically limited insofar as the region extends from the inflow side end of the partition wall to the position apart by a predetermined distance toward the outflow side along the extending direction. For example, like the first embodiment, the inflow cell side catalyst region is a region extending from the inflow side end of the partition wall to a position apart by a distance of 25% or more and 100% or less of the length in the extending direction of the partition wall toward the outflow side along the extending direction in some embodiments, may be a region extending to a position apart by a distance of 35% or more and 80% or less of the length in the extending direction of the partition wall, and may be a region extending to a position apart by a distance of 40% or more and 70% or less of the length in the extending direction of the partition wall.

The inflow cell side catalyst layer usually includes catalyst metal particles and a carrier supporting the catalyst metal particles, and is, for example, a sintered body including a carrier with catalyst in which the catalyst metal particles are supported by the carrier.

While a material of the catalyst metal particles is not specifically limited and a common material of a noble metal or the like can be used, examples of the material include a material containing at least one of Pt, Pd, or Rh. A mean particle size of the catalyst metal particles is similar to that of the catalyst metal particles included in the outflow cell side catalyst layer.

While a content of the catalyst metal particles is not specifically limited and may be a common content, the content differs depending on the material of the catalyst metal particles. For example, when the material is at least one of Pt, Pd, or Rh, the content is in a range of 0.05 g or more and 5 g or less per liter of the honeycomb substrate in some embodiments. This is because the content equal to or more than the lower limit of the range can provide the sufficient catalytic action, and the content equal to or less than the upper limit of the range can suppress the grain growth of the catalyst metal particles and provide an advantage in the aspect of cost. Here, the content of the catalyst metal particles per liter of the substrate volume means a value obtained by dividing the mass of the catalyst metal particles contained in the inflow cell side catalyst layer by the volume of a part of the honeycomb substrate in the axial direction having the axial length the same as the length in the extending direction of the inflow cell side catalyst layer (inflow cell side catalyst region).

A material and a shape of the carrier and a mean particle size of the carrier in powder form are similar to those of the carrier included in the outflow cell side catalyst layer.

A mass ratio of the catalyst metal particles to a total mass of the catalyst metal particles and the carrier is similar to the mass ratio of the outflow cell side catalyst layer. A method that causes the carrier to support the catalyst metal particles is similar to the method of the outflow cell side catalyst layer. The inflow cell side catalyst layer may contain a cocatalyst and the like similarly to the outflow cell side catalyst layer. The cocatalyst is similar to the cocatalyst contained in the outflow cell side catalyst layer.

While a density of the inflow cell side catalyst layer is not specifically limited, for example, the density is in a range of 30 g/L or more and 250 g/L or less in some embodiments. This is because the density equal to or more than the lower limit of the range allows effectively improving purification performance. That is because the density equal to or less than the upper limit of the range allows effectively suppressing the pressure loss. The "density of the inflow cell side catalyst layer" means a value obtained by dividing the total mass of the inflow cell side catalyst layer by the volume of a part of the honeycomb substrate in the axial direction having the axial length the same as the length in the extending direction of the inflow cell side catalyst layer.

While a method for forming the inflow cell side catalyst layer is not specifically limited and may be a common method, examples of the method include a method in which a slurry prepared by mixing the carrier with catalyst in which the catalyst metal particles are supported by the carrier with a solvent is supplied to at least one of the surface on the inflow cell side or the inner region on the inflow cell side in the inflow cell side catalyst region of the partition wall, and subsequently, the slurry is dried and fired.

The slurry may contain any given component such as a cocatalyst, a binder, and an additive as necessary in addition to the catalyst metal particles and the carrier, and the solvent. A method for preparing the slurry is not specifically limited and may be a common method. A mean particle size of the solid content of the slurry is not specifically limited and may be a common mean particle size.

A method for supplying the slurry to at least one of the surface on the inflow cell side or the inner region on the inflow cell side in the inflow cell side catalyst region of the partition wall is not specifically limited and may be a common method. In the method in which the slurry is dried and fired after the slurry is supplied to the partition wall, the drying and firing conditions are not specifically limited and may be common conditions.

(4) Others

Like the particulate filter according to the first embodiment, the particulate filter includes only the outflow cell side catalyst layers without including the inflow cell side catalyst layers as the catalyst layers in some embodiments. This is because the increased PM can be trapped from the exhaust gas, and therefore, the effect of suppressing the emission of CO generated by incomplete combustion of the PM becomes evident. In addition, this is because the pressure loss can be suppressed. While the particulate filter may be a GPF or a DPF, it is the GPF in some embodiments.

When the particulate filter further includes the inflow cell side catalyst layers, the particulate filter includes the inflow cell side catalyst layers including the catalyst metal particles that contain at least one of Pt or Pd and the outflow cell side catalyst layers including the catalyst metal particles that contain Rh in some embodiments. This is because since the exhaust gas contacts the outflow cell side catalyst layer after hydrocarbon (HC) included in the exhaust gas is effectively converted by the catalyst metal particles included in the inflow cell side catalyst layer, poisoning of Rh contained in the catalyst metal particles included in the outflow cell side catalyst layer by hydrocarbon (HC) can be suppressed. Furthermore, among the particulate filters as described above, the particulate filter includes the outflow cell side catalyst layers including the catalyst metal particles that contain Rh and at least one of Pt or Pd in some embodiments.

The particulate filter usually further includes the sealing portions sealing the outflow side ends of the inflow cells and the sealing portions sealing the inflow side ends of the outflow cells.

2. Three-way Catalyst

The three-way catalyst is not specifically limited. While the three-way catalyst is not specifically limited insofar as it is a common three-way catalyst, examples of the three-way catalyst include one that includes a monolith substrate and catalyst layers, like the three-way catalyst according to the first embodiment. In the monolith substrate, a frame portion and a partition wall partitioning a space inside the frame portion into a honeycomb shape are integrally formed. The catalyst layer is disposed on the wall surface inside a cell in the partition wall of the monolith substrate.

While a material of the monolith substrate is not specifically limited and a common material can be used, examples of the material include cordierite and the like. The catalyst layer includes a porous carrier that coats the wall surface and catalyst metal particles supported by the porous carrier. While the porous carrier of the catalyst layer is not specifically limited and a common carrier can be used, for example, the porous carrier includes an OSC material having an oxygen storage capacity (OSC) in some embodiments. While the OSC material is not specifically limited, examples of the OSC material include ceria, a composite oxide containing ceria, and the like. Examples of the composite oxide containing ceria include a ceria-zirconia composite oxide and the like. While the catalyst metal particles are not specifically limited, the catalyst metal particles may contain Rh and at least one of Pt or Pd or may contain Pt and Pd. Specifically, the catalyst metal particles containing Rh and at least one of Pt or Pd may contain, for example, Rh and Pt, may contain Rh and Pd, or may contain Rh, Pt, and Pd. Specifically, the catalyst metal particles containing Pt and Pd contain, for example, only Pt and Pd, without containing Rh.

3. Control Device

The control device controls the internal combustion engine so as to execute fuel cut during the deceleration operation of the internal combustion engine. Here, "during the deceleration operation of the internal combustion engine" means, for example, a time period when the engine rotation speed or the vehicle speed is larger than zero and the accelerator position is zero.

While the control device is not specifically limited insofar as it is one as described above, like the exemplary control method according to the first embodiment, during the fuel cut execution, the control device makes the opening degree of the throttle valve larger than the target opening degree during the deceleration operation of the internal combustion engine in some embodiments. This is because the reaction that burns and removes the PM in the GPF can be accelerated, and the emission of CO from the GPF can be effectively suppressed.

Furthermore, among the control devices as described above, like the exemplary control method according to the first embodiment, during the fuel cut execution, the control device makes the opening degree of the throttle valve larger than the target opening degree, subsequently estimates the accumulation amount of a particulate matter accumulating on the particulate filter, and decreases the opening degree of the throttle valve when the accumulation amount of the particulate matter becomes equal to or less than a preset target accumulation amount in some embodiments. This is because deterioration of the three-way catalyst can be suppressed. While the target accumulation amount of the accumulation amount of the particulate matter can be appropriately set considering an allowable pressure loss size and the like, the target accumulation amount of the accumulation amount of the particulate matter per GPF is set to a value of, for example, 0.5 g. In this case, the accumulation amount of the particulate matter accumulating per GPF is estimated, and when the accumulation amount of the particulate matter per GPF becomes equal to or less than the target accumulation amount (such as 0.5 g), the opening degree of the throttle valve is decreased.

Examples of a method for estimating the accumulation amount of the particulate matter (PM) accumulating on the particulate filter by the control device includes a differential pressure method for estimating the accumulation amount of the PM accumulating on the particulate filter based on a differential pressure between the front and rear of the particulate filter. The differential pressure method uses a relation in which accumulation of PM on a filter causes clogging of the filter and thereby the pressure inside an exhaust channel on the upstream side with respect to the filter becomes larger than the pressure in the exhaust channel on the downstream side with respect to the filter, and as a result, the larger the accumulation amount, the larger the differential pressure between the front and rear of the filter. Specifically, data or a calculation formula representing the relation is preliminarily stored in the control device, and the control device uses the data or the calculation formula to estimate the accumulation amount. In addition to the method, examples of the method for estimating the accumulation amount of the PM accumulating on the particulate filter by the control device include a method for estimating the accumulation amount of the PM accumulating on the particulate filter based on an accumulated value of a fuel injection quantity or the number of fuel injection from the fuel injection valve in the internal combustion engine.

4. Exhaust Gas Purification System

The exhaust gas purification system includes the three-way catalyst and the particulate filter arranged respectively on the upstream side and the downstream side of the exhaust channel connected to the internal combustion engine, and the control device controlling the internal combustion engine. While the internal combustion engine to which the exhaust gas purification system is connected is not specifically limited and may be a gasoline engine or a diesel engine, among them, it is a gasoline engine for driving a vehicle in some embodiments. When the internal combustion engine is a gasoline engine, the particulate filter is a GPF, and when the internal combustion engine is a diesel engine, the particulate filter is a DPF.

EXAMPLES

The following further specifically describes the exhaust gas purification system according to the embodiment with examples and comparative examples.

Example 1

The exemplary exhaust gas purification system 110 according to the first embodiment was produced.

Specifically, first, the three-way catalyst 80S and the GPF 80U used for the exhaust gas purification system 110 were prepared.

[Three-Way Catalyst]

The three-way catalyst 80S includes a monolith substrate and catalyst layers. In the monolith substrate, a cylindrical-shaped frame portion and a partition wall partitioning a space inside the frame portion into a honeycomb shape are integrally formed. The catalyst layer is disposed on the wall surface inside a cell in the partition wall of the monolith substrate. The catalyst layer includes a porous carrier that coats the wall surface and catalyst metal particles supported by the porous carrier. Details of these configurations are as follows.

Figure 7A:
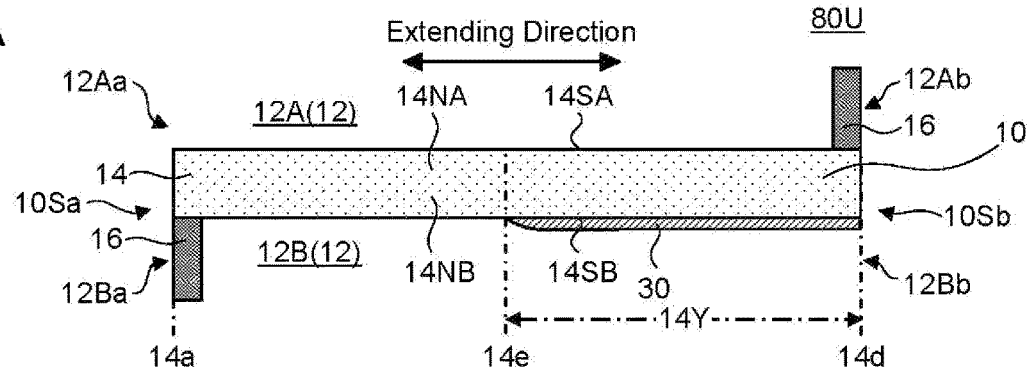
FIGS. 7A to 7D are respective cross-sectional views schematically illustrating the main parts of cross-sectional surfaces parallel to extending directions of cells in GPFs according to Examples 1 to 4.

Material of Monolith Substrate: Cordierite
Size of monolith substrate: outer diameter×axial length=117 mm×122 mm
Thickness of partition wall: 200 μm
Cell density: 300 per square inch
Material of porous carrier of catalyst layer: ceria-zirconia composite oxide and alumina
Material of catalyst metal particles of catalyst layer: Pt
[GPF]
FIG. 7A is a cross-sectional view schematically illustrating the main part of a cross-sectional surface parallel to the extending direction of the cells in the GPF according to Example 1. In the example, as illustrated in FIG. 7A, a GPF 80U that included the honeycomb substrate 10, the sealing portions 16, and the outflow cell side catalyst layers 30 including catalyst metal particles containing Pt was produced and prepared.

In the production of the GPF 80U, first, a non-coating type GPF over which a catalyst is not coated was prepared. The non-coating type GPF includes the honeycomb substrate 10, in which the cylindrical-shaped frame portion 11 and the partition wall 14 partitioning the space inside the frame portion 11 into a honeycomb shape are integrally formed, and the sealing portions 16. Details of these configurations are as follows.

Material of honeycomb substrate: cordierite
Size of honeycomb substrate: outer diameter×axial length=117 mm×122 mm
Thickness of partition wall: 240 μm
Cell density: 200 per square inch
Length in extending direction of sealing portion: 4 mm Next, a carrier with catalyst in which catalyst metal particles containing Pt were supported by a carrier in powder form was mixed with a solvent, thereby preparing a slurry for outflow cell side catalyst layer.

Next, the slurry for outflow cell side catalyst layer was poured into the outflow cell 12B in the non-coating type GPF from the outflow side end 12Bb, thereby supplying the slurry for outflow cell side catalyst layer on the surface 14SB on the outflow cell 12B side in the outflow cell side catalyst region 14Y of the partition wall 14. The outflow cell side catalyst region 14Y of the partition wall 14 is a region extending from the outflow side end 14d of the partition wall 14 to the position 14e apart from the outflow side end 14d by a distance of 52% of the length in the extending direction of the partition wall 14 toward the inflow side along the extending direction.

Next, the honeycomb substrate 10 to which the slurry for outflow cell side catalyst layer was supplied was dried using a dryer, and subsequently, fired using an electric furnace. By the procedure, the outflow cell side catalyst layers 30 were formed such that the content of Pt per GPF was 0.56 g/piece. As described above, the GPF 80U illustrated in FIG. 7A was produced.

Subsequently, in the exhaust channel 70 connected to the internal combustion engine 50, the three-way catalyst 80S was disposed immediately below the internal combustion engine 50 (on the upstream side), and the GPF 80U was disposed on the downstream side of the three-way catalyst 80S. Thus, the exhaust gas purification system 110 including the three-way catalyst 80S, the GPF 80U, and the ECU 40 was produced.

Example 2

Figure 7B:
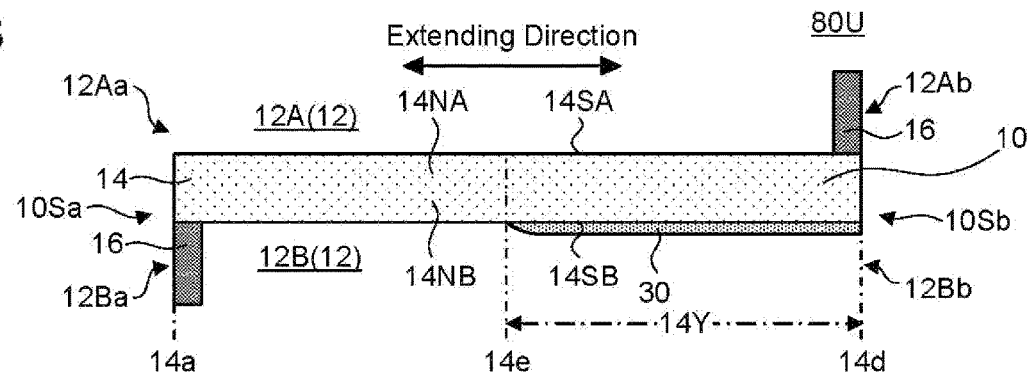

The exhaust gas purification system 110 was produced similarly to Example 1 except that a GPF 80U that included the outflow cell side catalyst layers 30 including catalyst metal particles containing Rh was produced and used as the GPF 80U. FIG. 7B is a cross-sectional view schematically illustrating the main part of a cross-sectional surface parallel to the extending direction of the cells in the GPF according to Example 2.

Specifically, in the production of the GPF 80U, first, a non-coating type GPF similar to that of Example 1 was prepared. Next, a carrier with catalyst in which catalyst metal particles containing Rh were supported by a carrier in powder form was mixed with a solvent, thereby preparing a slurry for outflow cell side catalyst layer. Next, the slurry for outflow cell side catalyst layer was supplied on the surface 14SB on the outflow cell 12B side in the outflow cell side catalyst region 14Y of the partition wall 14 similarly to Example 1. The outflow cell side catalyst region 14Y of the partition wall 14 is a region similar to that of Example 1. Next, the honeycomb substrate 10 to which the slurry for outflow cell side catalyst layer was supplied was dried using a dryer, and subsequently, fired using an electric furnace. By the procedure, the outflow cell side catalyst layers 30 were formed such that the content of Rh per GPF was 0.39 g/piece. As described above, the GPF 80U illustrated in FIG. 7B was produced.

In the exhaust channel 70 connected to the internal combustion engine 50, the GPF 80U was disposed with the three-way catalyst 80S similarly to Example 1 to produce the exhaust gas purification system 110.

Example 3

Figure 7C:
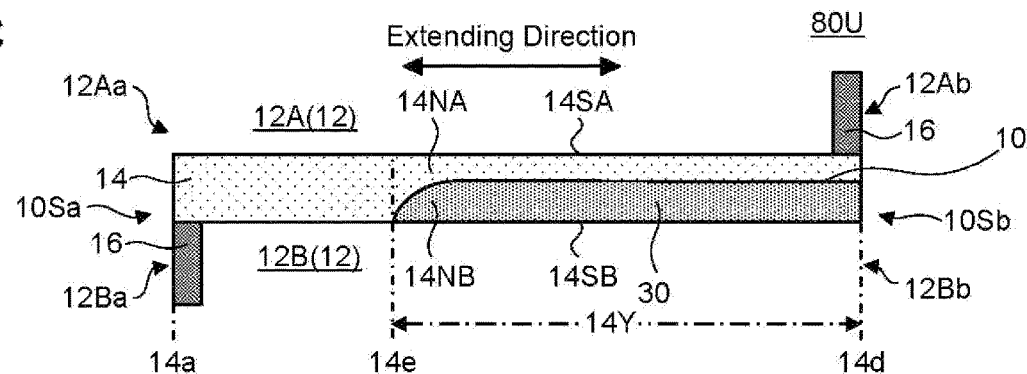

The exhaust gas purification system 110 was produced similarly to Example 1 except that a GPF 80U that had the outflow cell side catalyst layers 30 including catalyst metal particles containing Rh formed in a region of the partition wall different from that of Example 1 was produced and used as the GPF 80U. FIG. 7C is a cross-sectional view schematically illustrating the main part of a cross-sectional surface parallel to the extending direction of the cells in the GPF according to Example 3.

Specifically, in the production of the GPF 80U, first, a non-coating type GPF similar to that of Example 1 was prepared. Next, a carrier with catalyst in which catalyst metal particles containing Rh were supported by a carrier in powder form was mixed with a solvent, thereby preparing a slurry for outflow cell side catalyst layer. Next, the slurry for outflow cell side catalyst layer was supplied in the inner region 14NB on the outflow cell 12B side in the outflow cell side catalyst region 14Y of the partition wall 14. The outflow cell side catalyst region 14Y of the partition wall 14 is a region extending from the outflow side end 14d of the partition wall 14 to the position 14e apart from the outflow side end 14d by a distance of 68% of the length in the extending direction of the partition wall 14 toward the inflow side along the extending direction. Next, the honeycomb substrate 10 to which the slurry for outflow cell side catalyst layer was supplied was dried using a dryer, and subsequently, fired using an electric furnace. By the procedure, the outflow cell side catalyst layers 30 were formed such that the content of Rh per GPF was 0.39 g/piece. As described above, the GPF 80U illustrated in FIG. 7C was produced.

In the exhaust channel 70 connected to the internal combustion engine 50, the GPF 80U was disposed with the three-way catalyst 80S similarly to Example 1 to produce the exhaust gas purification system 110.

Example 4

Figure 7D:
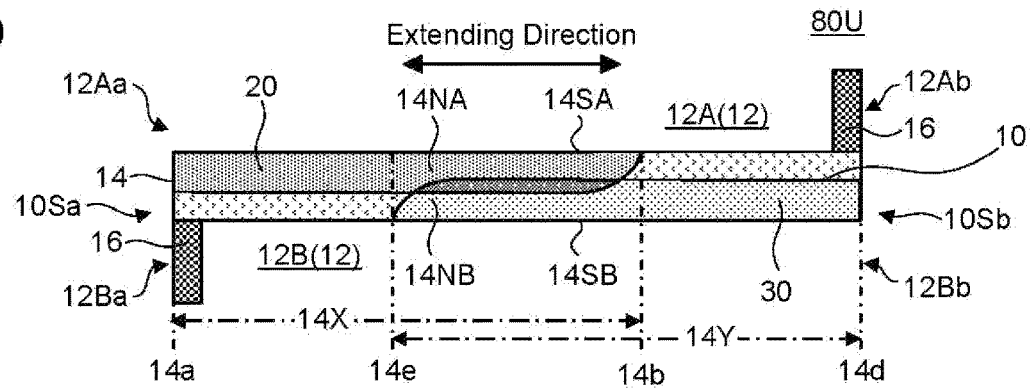

The exhaust gas purification system 110 was produced similarly to Example 1 except as follows. Using a non-coating type GPF different from that of Example 1, a GPF 80U that had the outflow cell side catalyst layer 30 including catalyst metal particles containing Pd formed in a region of the partition wall different from that of Example 1 and further included inflow cell side catalyst layers 20 including catalyst metal particles containing Rh, was produced and used as the GPF 80U. FIG. 7D is a cross-sectional view schematically illustrating the main part of a cross-sectional surface parallel to the extending direction of the cells in the GPF according to Example 4.

Specifically, in the production of the GPF 80U, first, a non-coating type GPF different from that of Example 1 was prepared. The non-coating type GPF includes honeycomb substrate 10, in which the cylindrical-shaped frame portion 11 and the partition wall 14 partitioning the space inside the frame portion 11 into a honeycomb shape are integrally formed, and the sealing portions 16. Details of these configurations are as follows.

Material of honeycomb substrate: cordierite
Size of honeycomb substrate: outer diameter×axial length=117 mm×122 mm
Thickness of partition wall: 200 µm
Cell density: 300 per square inch
Length in extending direction of sealing portion: 4 mm Next, a carrier with catalyst in which catalyst metal particles containing Rh were supported by a carrier in powder form was mixed with a solvent, thereby preparing a slurry for inflow cell side catalyst layer. Next, the slurry for inflow cell side catalyst layer was poured into the inflow cell 12A in the non-coating type GPF from the inflow side end 12Aa, thereby supplying the slurry for inflow cell side catalyst layer in the inner region 14NA on the inflow cell 12A side in an inflow cell side catalyst region 14X of the partition wall 14. The inflow cell side catalyst region 14X of the partition wall 14 is a region extending from the inflow side end 14a of the partition wall 14 to a position 14b apart from the inflow side end 14a by a distance of 68% of the length in the extending direction of the partition wall 14 toward the outflow side along the extending direction. Next, the honeycomb substrate 10 to which the slurry for inflow cell side catalyst layer was supplied was dried using a dryer, and subsequently, fired using an electric furnace. By the procedure, the inflow cell side catalyst layers 20 were formed such that the content of Rh per GPF was 0.39 g/piece.

Next, a carrier with catalyst in which catalyst metal particles containing Pd were supported by a carrier in powder form was mixed with a solvent, thereby preparing a slurry for outflow cell side catalyst layer. Next, the slurry for outflow cell side catalyst layer was supplied in the inner region 14NB on the outflow cell 12B side in the outflow cell side catalyst region 14Y of the partition wall 14. The outflow cell side catalyst region 14Y of the partition wall 14 is a region extending from the outflow side end 14d of the partition wall 14 to the position 14e apart from the outflow side end 14d by a distance of 68% of the length in the extending direction of the partition wall 14 toward the inflow side along the extending direction. Next, the honeycomb substrate 10 to which the slurry for outflow cell side catalyst layer was supplied was dried using a dryer, and subsequently, fired using an electric furnace. By the procedure, the outflow cell side catalyst layers 30 were formed such that the content of Pd per GPF was 0.77 g/piece. As described above, the GPF 80U illustrated in FIG. 7D was produced.

In the exhaust channel 70 connected to the internal combustion engine 50, the GPF 80U was disposed with the three-way catalyst 80S similarly to Example 1 to produce the exhaust gas purification system 110.

Comparative Example 1

Figure 8A:
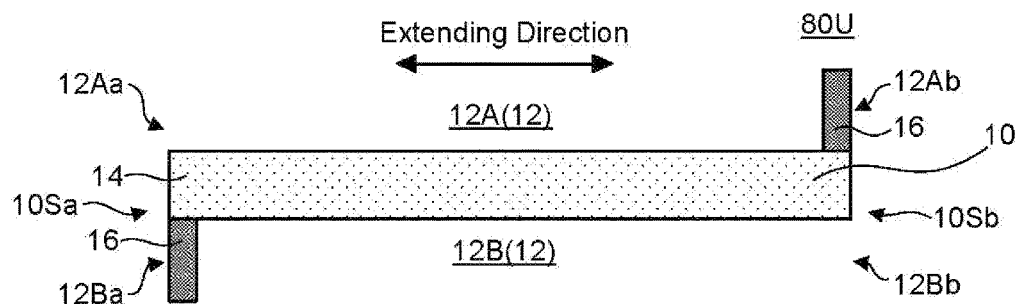
FIGS. 8A to 8C is respective cross-sectional views schematically illustrating the main parts of cross-sectional surfaces parallel to extending directions of cells in GPFs according to Comparative Examples 1 to 3.

The exhaust gas purification system 110 was produced similarly to Example 1 except that the non-coating type GPF prepared in Examples 1 to 3 was used directly as the GPF 80U. FIG. 8A is a cross-sectional view schematically illustrating the main part of a cross-sectional surface parallel to the extending direction of the cells in the GPF according to Comparative Example 1.

Specifically, in the exhaust channel 70 connected to the internal combustion engine 50, the GPF 80U in which the non-coating type GPF was directly used was disposed with the three-way catalyst 80S similarly to Example 1 to produce the exhaust gas purification system 110.

Comparative Example 2

Figure 8B:
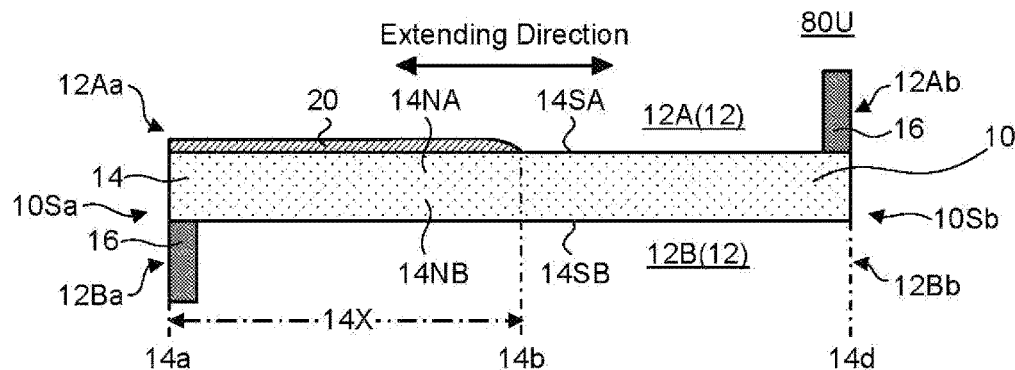

The exhaust gas purification system 110 was produced similarly to Example 1 except that a GPF 80U that included the inflow cell side catalyst layers 20 including catalyst metal particles containing Pt without including the outflow cell side catalyst layers 30 was produced and used as the GPF 80U. FIG. 8B is a cross-sectional view schematically illustrating the main part of a cross-sectional surface parallel to the extending direction of the cells in the GPF according to Comparative Example 2.

Specifically, in the production of the GPF 80U, first, a non-coating type GPF similar to that of Example 1 was prepared. Next, a carrier with catalyst in which catalyst metal particles containing Pt were supported by a carrier in powder form was mixed with a solvent, thereby preparing a slurry for inflow cell side catalyst layer. Next, the slurry for inflow cell side catalyst layer was poured into the inflow cell 12A in the non-coating type GPF from the inflow side end 12Aa, thereby supplying the slurry for inflow cell side catalyst layer on the surface 14SA on the inflow cell 12A side in the inflow cell side catalyst region 14X of the partition wall 14. The inflow cell side catalyst region 14X of the partition wall 14 is a region extending from the inflow side end 14a of the partition wall 14 to the position 14b apart from the inflow side end 14a by a distance of 52% of the length in the extending direction of the partition wall 14 toward the outflow side along the extending direction. Next, the honeycomb substrate 10 to which the slurry for inflow cell side catalyst layer was supplied was dried using a dryer, and subsequently, fired using an electric furnace. By the procedure, the inflow cell side catalyst layers 20 were formed such that the content of Pt per GPF was 0.56 g/piece. As described above, the GPF 80U illustrated in FIG. 8B was produced.

In the exhaust channel 70 connected to the internal combustion engine 50, the GPF 80U was disposed with the three-way catalyst 80S similarly to Example 1 to produce the exhaust gas purification system 110.

Comparative Example 3

Figure 8C:
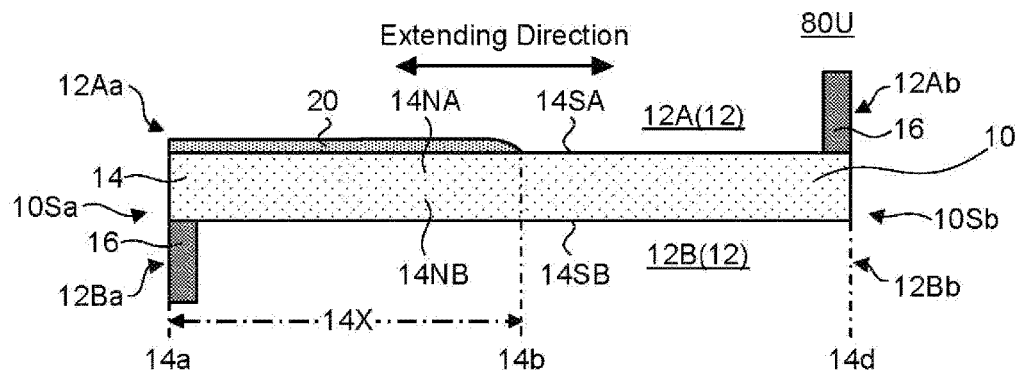

The exhaust gas purification system 110 was produced similarly to Example 1 except that a GPF 80U that included the inflow cell side catalyst layers 20 including catalyst metal particles containing Rh without including the outflow cell side catalyst layers 30 was produced and used as the GPF 80U. FIG. 8C is a cross-sectional view schematically illustrating the main part of a cross-sectional surface parallel to the extending direction of the cells in the GPF according to Comparative Example 3.

Specifically, in the production of the GPF 80U, first, a non-coating type GPF similar to that of Example 1 was prepared. Next, a carrier with catalyst in which catalyst metal particles containing Rh were supported by a carrier in powder form was mixed with a solvent, thereby preparing a slurry for inflow cell side catalyst layer. Next, the slurry for inflow cell side catalyst layer was poured into the inflow cell 12A in the non-coating type GPF from the inflow side end 12Aa, thereby supplying the slurry for inflow cell side catalyst layer on the surface 14SA on the inflow cell 12A side in the inflow cell side catalyst region 14X of the partition wall 14. The inflow cell side catalyst region 14X of the partition wall 14 is a region extending from the inflow side end 14a of the partition wall 14 to the position 14b apart from the inflow side end 14a by a distance of 52% of the length in the extending direction of the partition wall 14 toward the outflow side along the extending direction. Next, the honeycomb substrate 10 to which the slurry for inflow cell side catalyst layer was supplied was dried using a dryer, and subsequently, fired using an electric furnace. By the procedure, the inflow cell side catalyst layers 20 were formed such that the content of Rh per GPF was 0.39 g/piece. As described above, the GPF 80U illustrated in FIG. 8C was produced.

In the exhaust channel 70 connected to the internal combustion engine 50, the GPF 80U was disposed with the three-way catalyst 80S similarly to Example 1 to produce the exhaust gas purification system 110.

[Evaluation]

For each of the exhaust gas purification systems 110 produced in Examples 1 to 4 and Comparative Examples 1 to 3, a suppressing effect of the emission of carbon monoxide (CO) was evaluated. Specifically, first, the exhaust gas purification system 110 of each example was applied as the exhaust gas purification system 110 in the intake and exhaust system 100 similar to the intake and exhaust system of the internal combustion engine according to the first embodiment. Afterwards, in the intake and exhaust system 100, when the ECU 40 controlled the internal combustion engine 50 so as to execute fuel cut during the deceleration operation of the internal combustion engine 50, a CO concentration of an incoming gas that flowed into the GPF 80U in a period between before the start and after the end of the fuel cut execution and a CO concentration of an outgoing gas that was discharged from the GPF 80U in the period were measured. The effect was evaluated from the measurement results. The following describes the contents of the evaluation after describing the measurement procedure and the measurement results.

(Measurement Procedure)

First, in the intake and exhaust system 100 in which the exhaust gas purification system 110 of each example was applied, an exhaust gas was distributed to the GPF 80U by mounting a diesel engine as the internal combustion engine 50 and subsequently operating the internal combustion engine 50, thereby causing PM to accumulate on the GPF 80U by 3.9 g per GPF.

Next, in the intake and exhaust system 100, an exhaust gas having an air-fuel ratio (A/F) of 14.7 (stoichiometric) was supplied to the three-way catalyst 80S by mounting a gasoline engine as the internal combustion engine 50 and subsequently operating the internal combustion engine 50, and the temperature of the incoming gas that flowed into the GPF 80U was raised from 200° C. to 700° C. under the condition of an intake air flow rate (Ga)=28 g/s.

Next, after the temperature of the incoming gas that flowed into the GPF 80U became stabilized at 700° C., the deceleration operation of the internal combustion engine 50 was started, and the internal combustion engine 50 was controlled so as to execute fuel cut during the deceleration operation by the ECU 40. At this time, after the deceleration operation continued so as to execute the fuel cut for about 20 seconds in a state where the opening degree Dth of the throttle valve 64 was decreased to the target opening degree during deceleration Dtht, the deceleration operation ended, thereby ending the fuel cut execution and resuming fuel injection from the fuel injection valve. After the fuel injection resumed, the opening degree Dth of the throttle valve 64 was returned back to its former state, and the internal combustion engine 50 was operated under the condition similar to that before the start of the deceleration operation. In the period between before the start and after the end of the fuel cut execution, the CO concentration of the incoming gas that flowed into the GPF 80U and the CO concentration of the outgoing gas that was discharged from the GPF 80U were measured. The CO concentrations were measured by respective analyzers disposed on the upstream side and the downstream side of the GPF 80U.

(Measurement Result)

Figure 9:
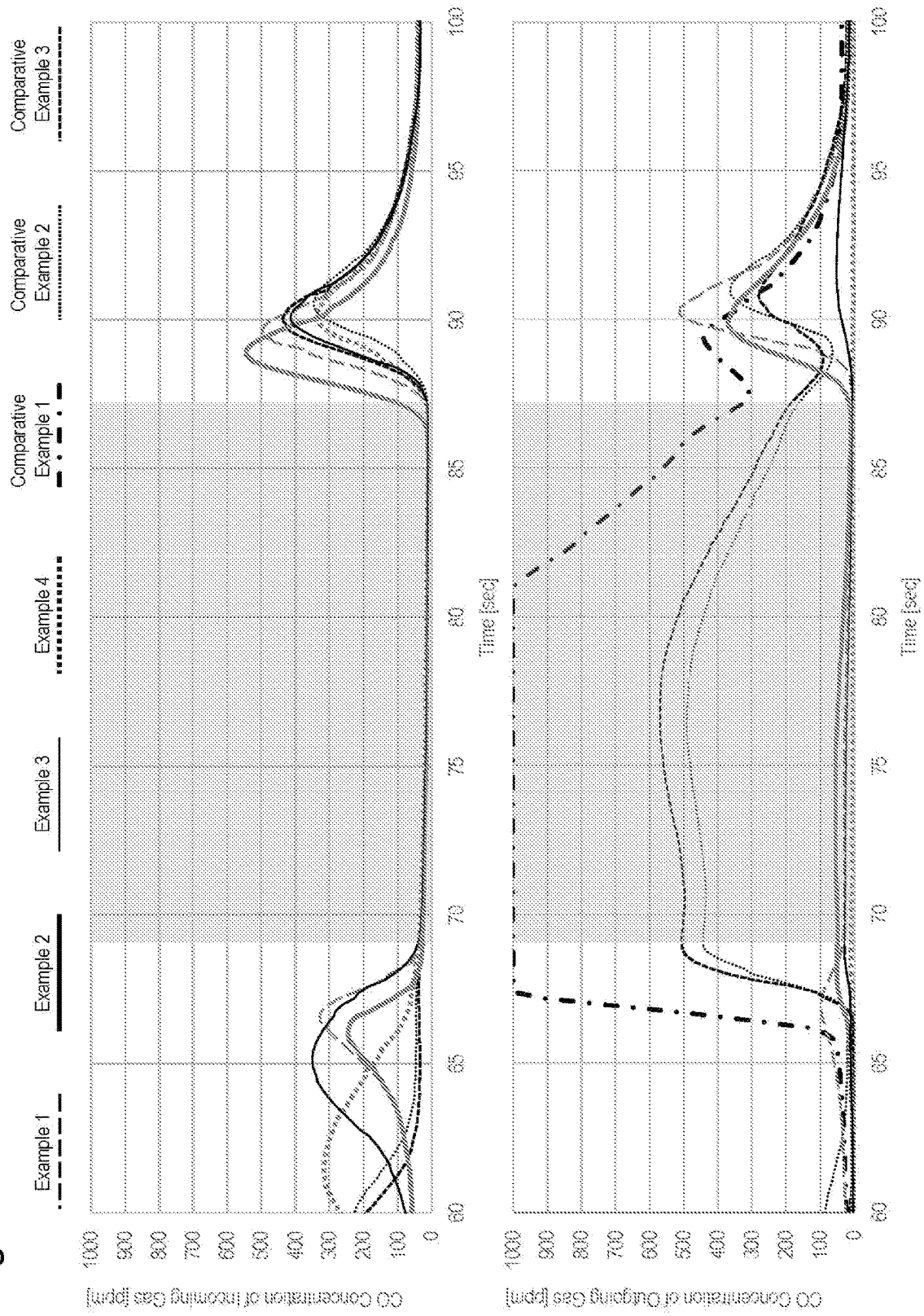
FIG. 9 has an upper side where a graph shows the transition of CO concentrations of an incoming gas of a GPF 80U in a period between before the start and after the end of fuel cut execution of Examples 1 to 4 and Comparative Examples 2 and 3, and a lower side where a graph shows the transition of CO concentrations of an outgoing gas of the GPF 80U in the period between before the start and after the end of fuel cut execution of Examples 1 to 4 and Comparative Examples 1 to 3.
Figure 10:
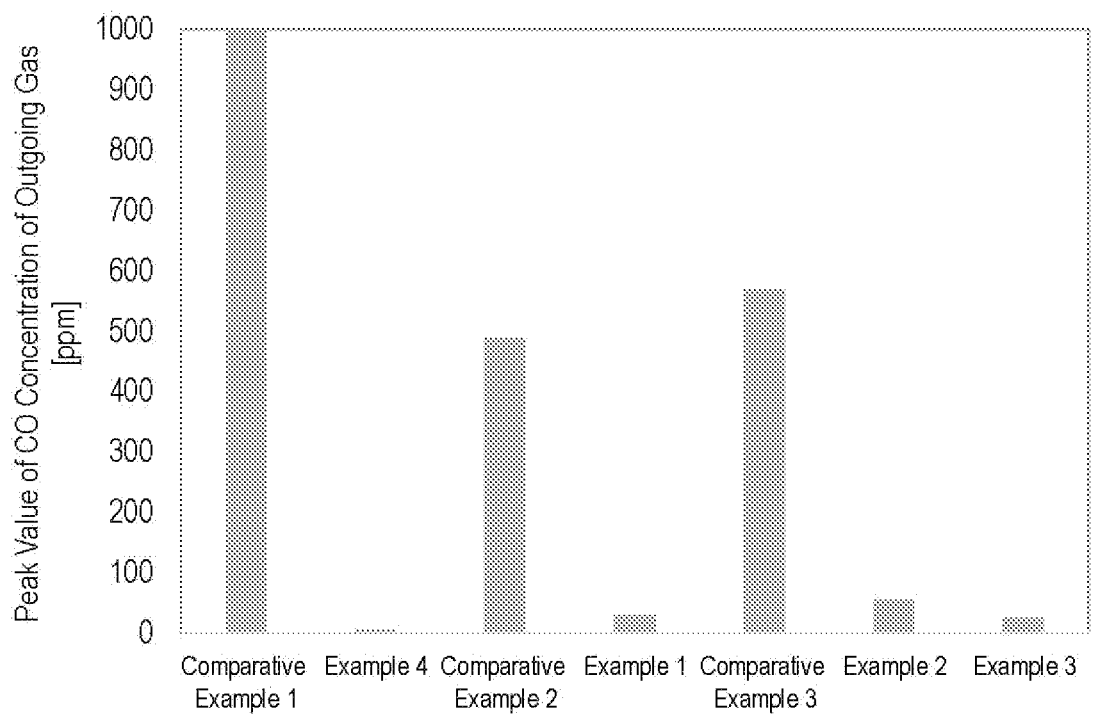
FIG. 10 is a graph showing peak values of the CO concentrations of the outgoing gas of the GPF 80U in the period between before the start and after the end of fuel cut execution in exhaust gas purification systems of Examples 1 to 4 and Comparative Examples 1 to 3.

FIG. 9 has an upper side where a graph shows the transition of the CO concentrations of the incoming gas of the GPF 80U in the period between before the start and after the end of the fuel cut execution of Examples 1 to 4 and Comparative Examples 2 and 3, and an lower side where a graph shows the transition of the CO concentrations of the outgoing gas of the GPF 80U in the period between before the start and after the end of the fuel cut execution of Examples 1 to 4 and Comparative Examples 1 to 3. In the graphs on the upper side and the lower side of FIG. 9, the time slots during the fuel cut execution are shown by half-tone dot meshing. FIG. 10 is a graph showing peak values of the CO concentrations of the outgoing gas of the GPF 80U in the period between before the start and after the end of the fuel cut execution in the exhaust gas purification systems of Examples 1 to 4 and Comparative Examples 1 to 3.

As illustrated in FIG. 9 and FIG. 10, in the exhaust gas purification system 110 of Comparative Example 1 in which the non-coating type GPF over which a catalyst was not coated was directly used as the GPF 80U, the peak value of the CO concentration of the outgoing gas during the fuel cut execution exceeds 1000 ppm. In contrast to this, in the exhaust gas purification systems 110 of Examples 1 to 3 in which the GPF 80U including only the outflow cell side catalyst layers 30 as the catalyst layers was used, the peak values of the CO concentrations of the outgoing gas during the fuel cut execution substantially lowers to a level close to the peak value of the exhaust gas purification system 110 of Example 4 in which the GPF 80U including the inflow cell side catalyst layers 20 and the outflow cell side catalyst layers 30 as the catalyst layers was used. On the other hand, in the exhaust gas purification systems 110 of Examples 2 and 3 in which the GPF 80U including only the inflow cell side catalyst layers 20 as the catalyst layers was used, the peak values of the CO concentrations of the outgoing gas during the fuel cut execution become lower than that of Comparative Example 1, but still remains at a high level. It is considered that this is because, when only the inflow cell side catalyst layers 20 are included as the catalyst layers, a large proportion of CO generated by incomplete combustion of C in the PM in the partition wall of the honeycomb substrate is discharged from the GPF 80U without flowing along the catalyst layers or passing through the catalyst layers.

While an embodiment of the exhaust gas purification system of the present disclosure has been described in detail, the present disclosure is not limited to the above-described embodiment, but various kinds of changes of design are allowed within a range not departing from the spirits of the present disclosure described in the claims.

All publications, patents and patent applications cited in the present description are herein incorporated by reference as they are.

DESCRIPTION OF SYMBOLS

110 Exhaust gas purification system
100 Intake and exhaust system
40 ECU (control device)
50 Internal combustion engine
60 Intake channel
70 Exhaust channel
80S Three-way catalyst
80U GPF (gasoline particulate filter)
10 Honeycomb substrate
10Sa Inflow side end surface
10Sb Outflow side end surface
12 Cell
12A Inflow cell
12B Outflow cell
14 Partition wall
14X Inflow cell side catalyst region
14Y Outflow cell side catalyst region
14SA Surface on inflow cell side
14NA Inner region on inflow cell side
14SB Surface on outflow cell side
14NB Inner region on outflow cell side
16 Sealing portion
20 Inflow cell side catalyst layer
30 Outflow cell side catalyst layer

What is claimed is:

1. An exhaust gas purification system comprising:
a three-way catalyst and a particulate filter arranged respectively on an upstream side and a downstream side of an exhaust channel connected to an internal combustion engine; and
a control device that controls the internal combustion engine so as to execute fuel cut during a deceleration operation of the internal combustion engine,
wherein the particulate filter includes a honeycomb substrate and an outflow cell side catalyst layer,
wherein the honeycomb substrate includes a porous partition wall defining a plurality of cells extending from an inflow side end surface to an outflow side end surface,
wherein the plurality of cells include an inflow cell and an outflow cell adjacent across the partition wall,
wherein the inflow cell has an open inflow side end and a sealed outflow side end,
wherein the outflow cell has a sealed inflow side end and an open outflow side end, and
wherein the outflow cell side catalyst layer is disposed either on a surface on the outflow cell side or in an inner region on the outflow cell side, or both on the surface and in the inner region in an outflow cell side catalyst region extending from an outflow side end of the partition wall to a position apart from the outflow side end toward an inflow side of the partition wall along an extending direction of the partition wall.

2. The exhaust gas purification system according to claim 1,
wherein, during the fuel cut execution, the control device makes an opening degree of a throttle valve larger than a target opening degree during the deceleration operation of the internal combustion engine.

3. The exhaust gas purification system according to claim 2,
wherein, during the fuel cut execution, the control device makes the opening degree of the throttle valve larger than the target opening degree, subsequently estimates an accumulation amount of a particulate matter accumulating on the particulate filter, and decreases the opening degree of the throttle valve when the accumulation amount of the particulate matter becomes equal to or less than a preset target accumulation amount.

\* \* \* \* \*